United States Patent [19]

Ishibashi et al.

[11] Patent Number: 5,448,485
[45] Date of Patent: Sep. 5, 1995

[54] ROUTE INFORMATION INPUT APPARATUS AND METHOD THEREOF

[75] Inventors: Katsunori Ishibashi, Kawasaki; Kouji Fukuda, Yokohama; Masatoshi Hino, Zama; Tetsuo Machida, Tokyo; Tadahiko Masuda, Atsugi; Kazuhisa Takura, Kawasaki; Isamu Machida, Nagoya; Kunio Fujisaki, Aichi, all of Japan

[73] Assignees: Hitachi, Ltd., Tokyo; Hitachi Microcomputer System Ltd., Tolyo, both of Japan

[21] Appl. No.: 984,857

[22] Filed: Dec. 3, 1992

[30] Foreign Application Priority Data

Dec. 11, 1991 [JP] Japan ................................. 3-327332

[51] Int. Cl.⁶ ................................................ G01C 21/04
[52] U.S. Cl. ..................................... 364/443; 364/444; 364/449; 340/988; 340/989; 340/990
[58] Field of Search ................ 340/988, 989; 395/157, 395/100; 364/444, 412.22, 449, 443

[56] References Cited

U.S. PATENT DOCUMENTS

| | | | |
|---|---|---|---|
| 4,646,089 | 2/1987 | Takanabe et al. | 364/449 |
| 4,890,104 | 12/1989 | Takanabe et al. | 364/449 |
| 4,937,572 | 6/1990 | Yamada et al. | 364/990 |
| 4,954,819 | 9/1990 | Watkins | 395/157 |
| 5,041,983 | 8/1991 | Nakahara et al. | 364/449 |
| 5,046,011 | 9/1991 | Kakihara | 340/990 |
| 5,250,933 | 10/1993 | Beaudin | 364/413.22 |
| 5,293,462 | 3/1994 | Nishimoto et al. | 395/100 |

Primary Examiner—Kevin J. Teska
Assistant Examiner—Thai Phan
Attorney, Agent, or Firm—Fay, Sharpe, Beall, Fagan, Minnich & McKee

[57] ABSTRACT

A route information input apparatus for specifying a route from an entraining station to an arrival station including a pointing device operated by the user to designate a position on a display screen and a data processing apparatus for executing a data processing in accordance with a program prepared in advance each time the user operates the pointing device to thereby change a displayed content on the display screen. On the basis of positional informations of major stations stored in a first file, a line diagram presented in the simplified form in which truly existing stations are partly omitted and in which the major stations are connected by means of line segments is displayed on a first area of the display screen. A group of station name data omitted from the line diagram displayed on the first area are selectively displayed on a second area of the display screen in the form of a table. Then, stations or lines selected from the first area or from the second area by the pointing device are sequentially stored as route specifying informations. As the route is specified, a display form is sequentially changed so that a route portion that was already specified and a line portion that can be selected next can be distinguished from other line portions with ease in the line diagram displayed in the second area.

8 Claims, 34 Drawing Sheets

F I G. 9A
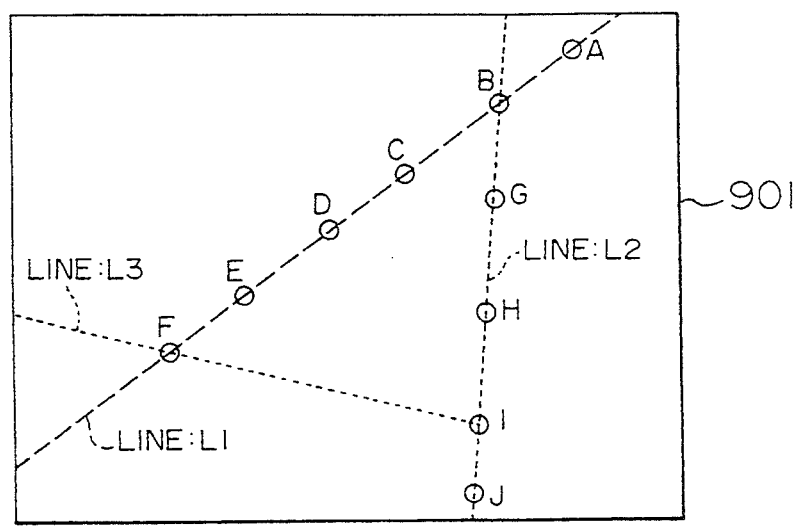
F I G. 9B
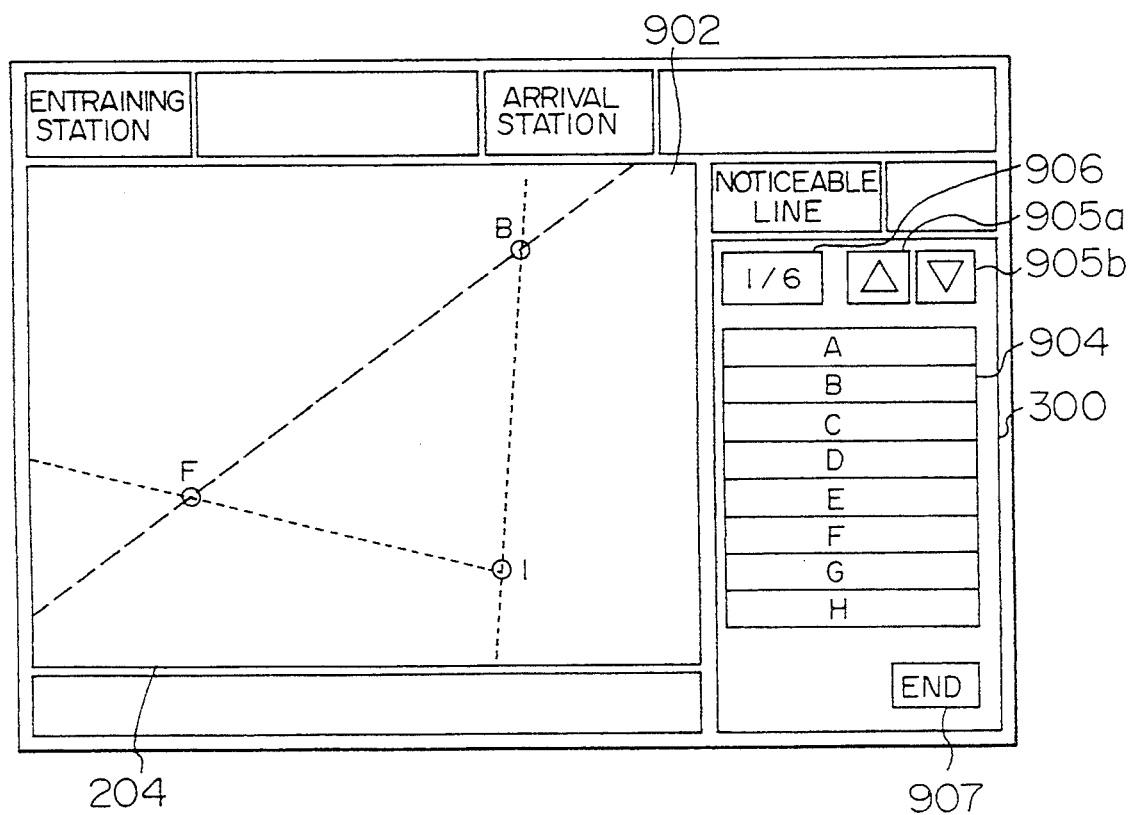

F I G. 15
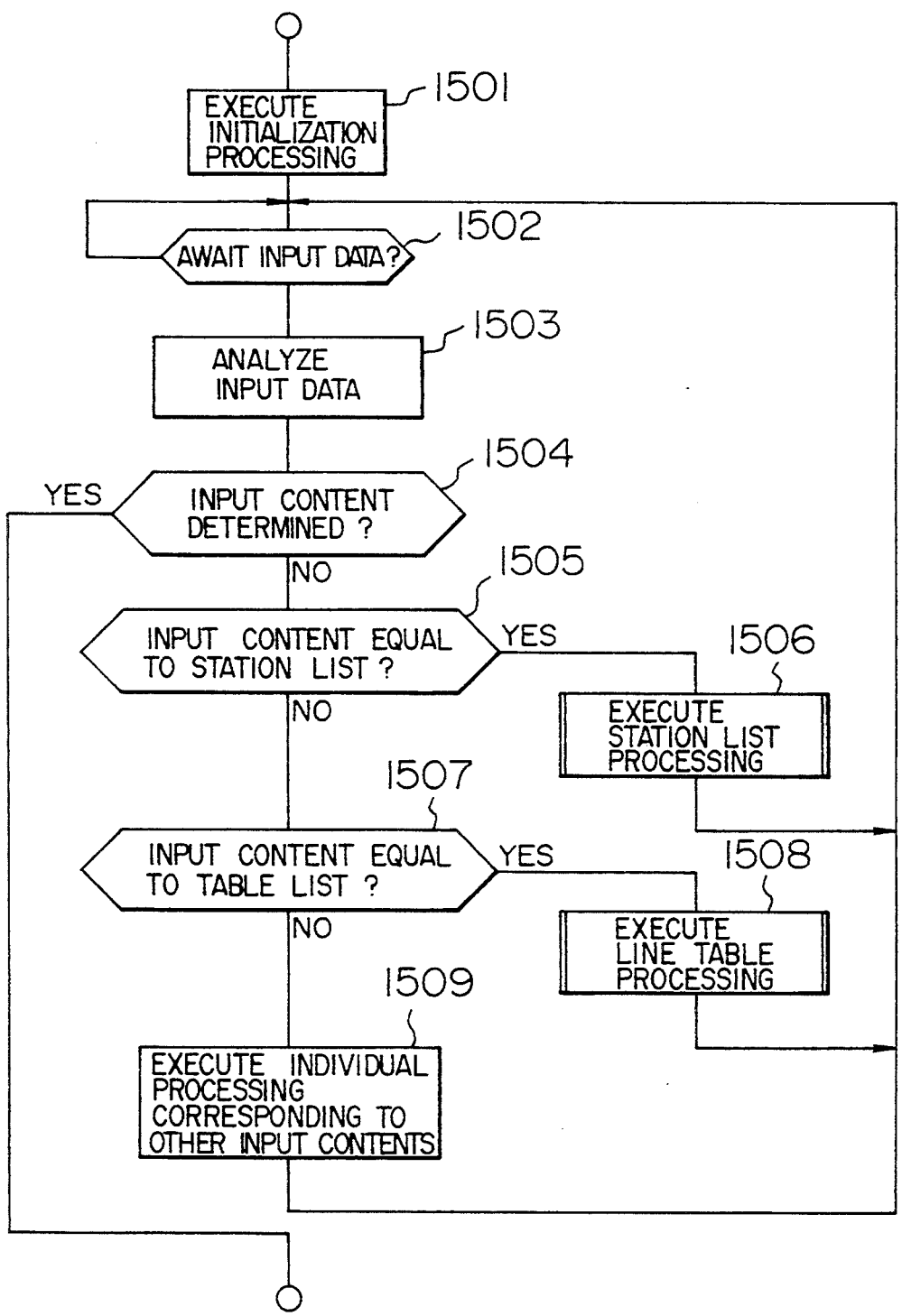

F I G. 20
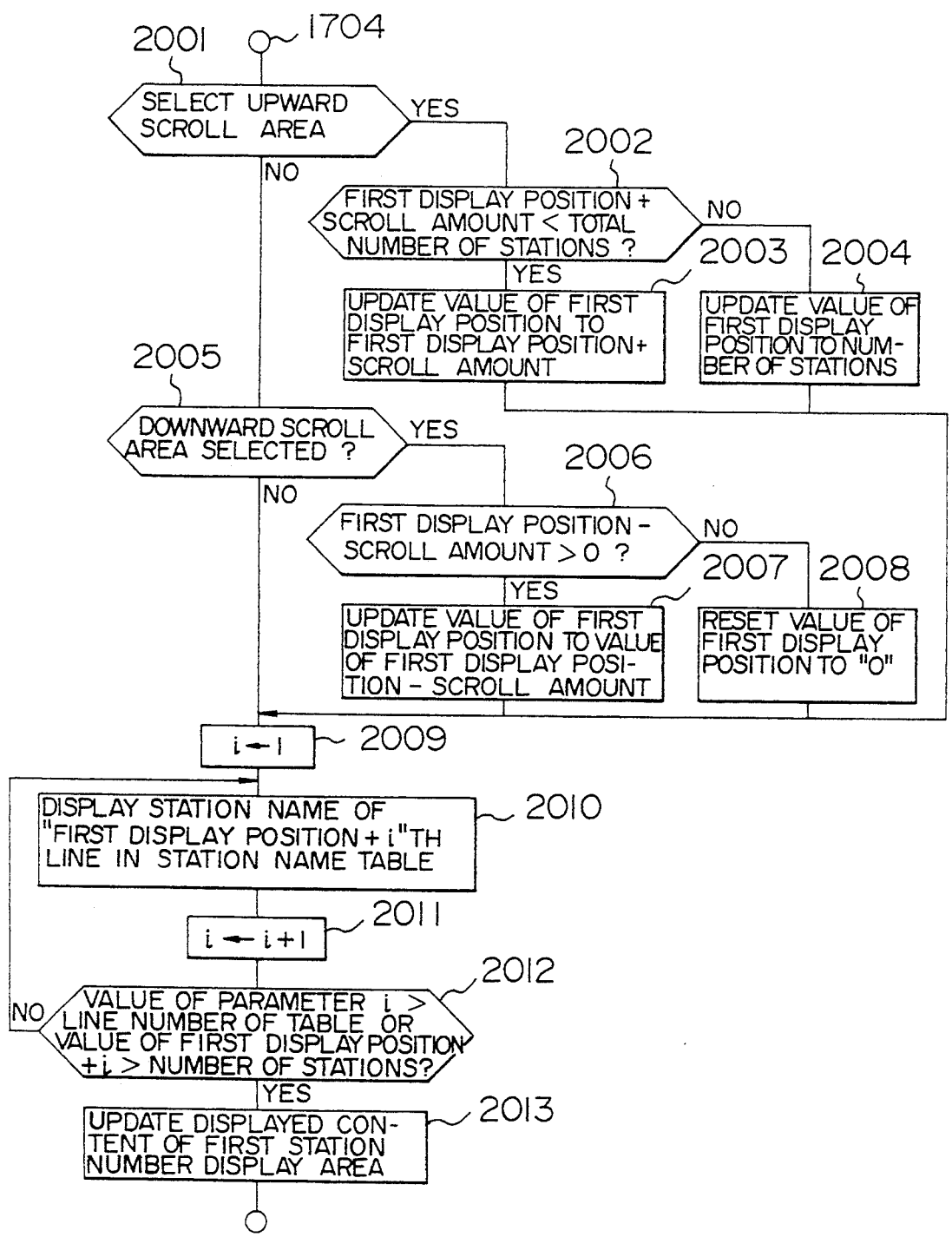

F I G. 23
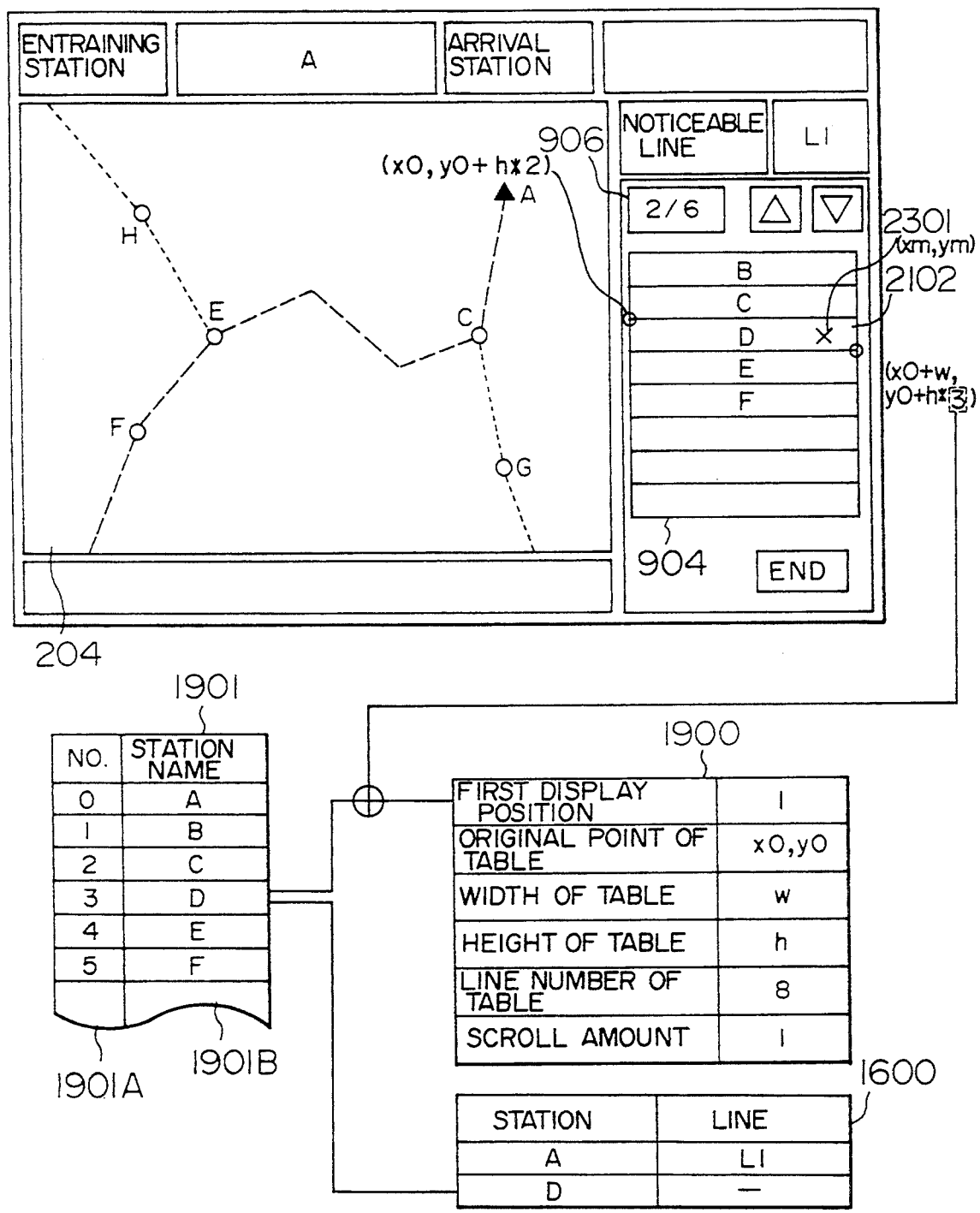

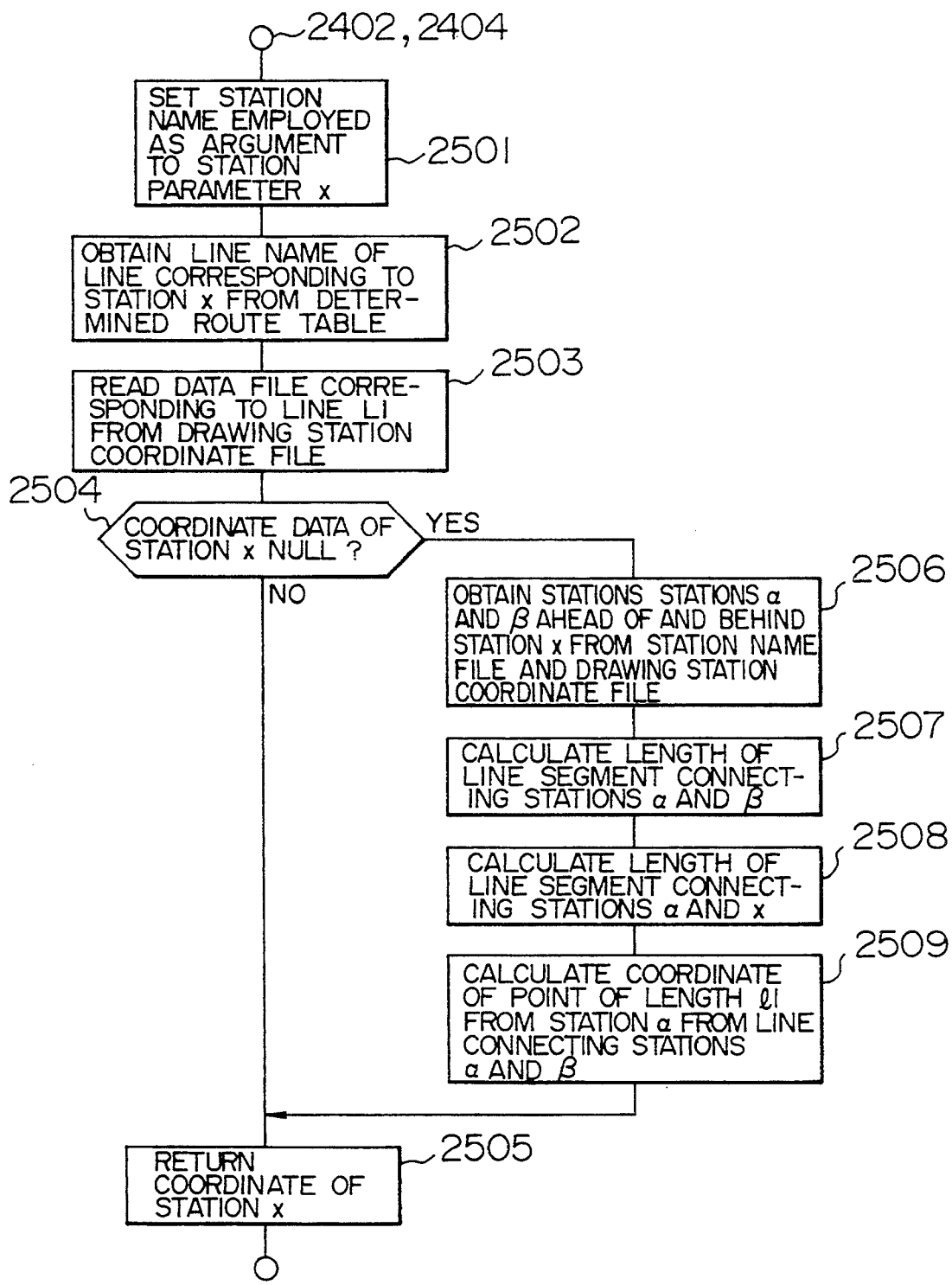

$$L1 = \sqrt{(xd1-xc)^2+(yd1-yc)^2}$$
$$L2 = \sqrt{(xd2-xd1)^2+(yd2-yd1)^2}$$
$$L3 = \sqrt{(xe-xd2)^2+(ye-yd2)^2}$$
$$L = L1+L2+L3$$

2601

$$LL = L * \frac{1(: \text{NUMBER OF SECTION BETWEEN STATIONS C AND D})}{2(: \text{NUMBER OF SECTION BETWEEN STATIONS C AND E})}$$

2602

$$L1 \leqq LL \leqq (L1+L2)$$

2603

$$xd = \frac{LL-L1}{L2} * (xd2-xd1)+xd1$$
$$yd = \frac{LL-L1}{L2} * (yd2-yd1)+yd1$$

2605

F I G. 32
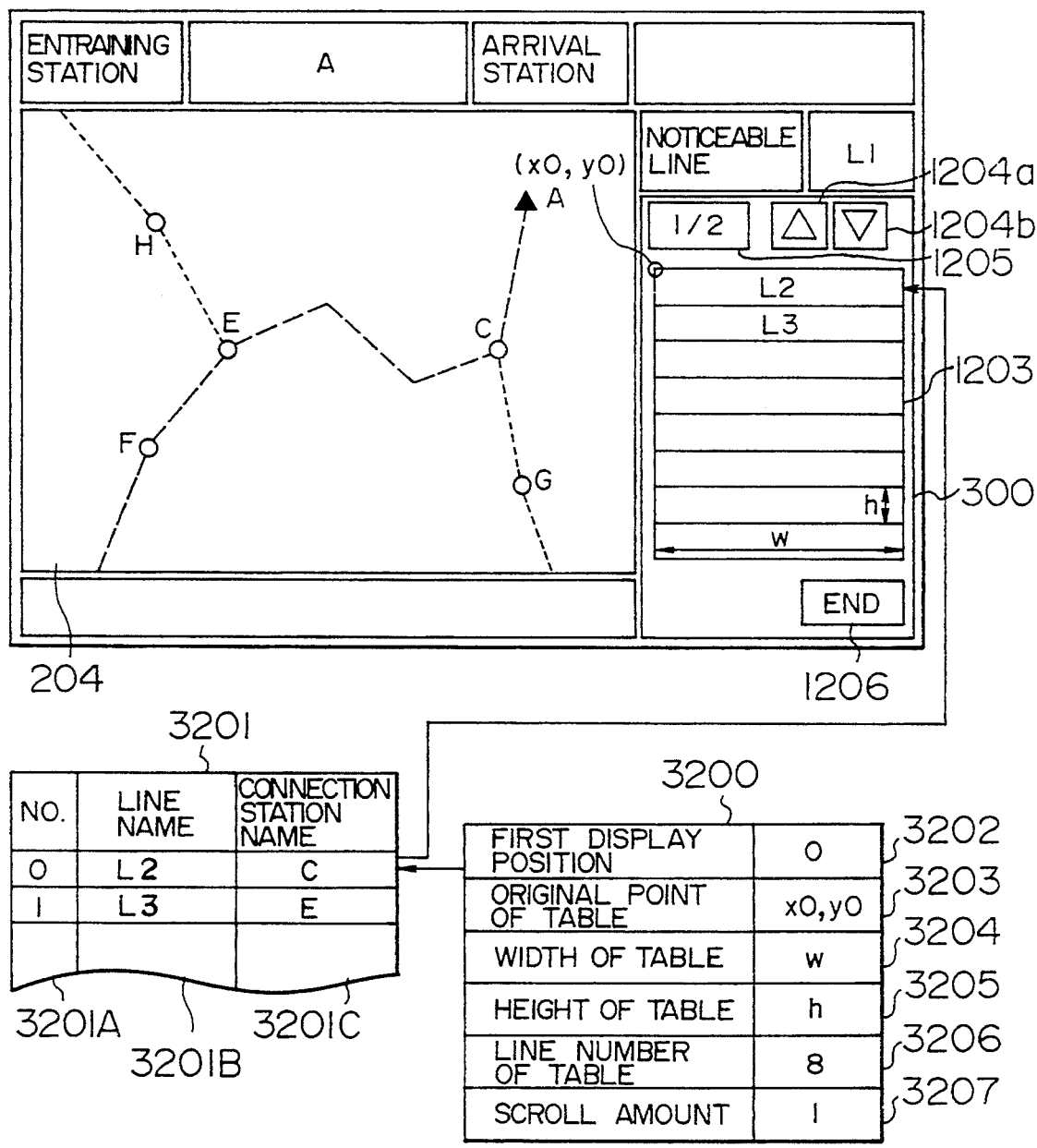

F I G. 33
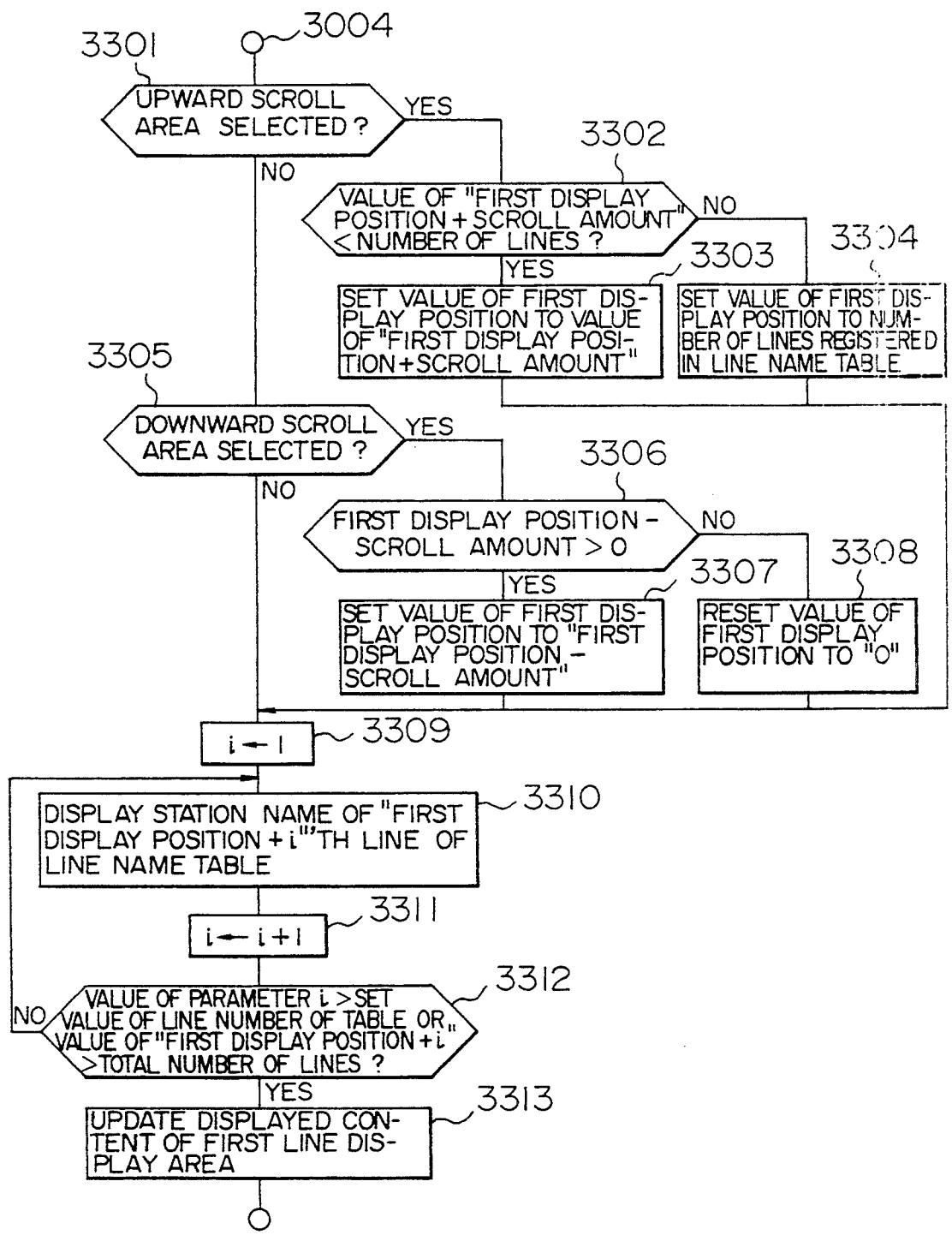

FIG. 36
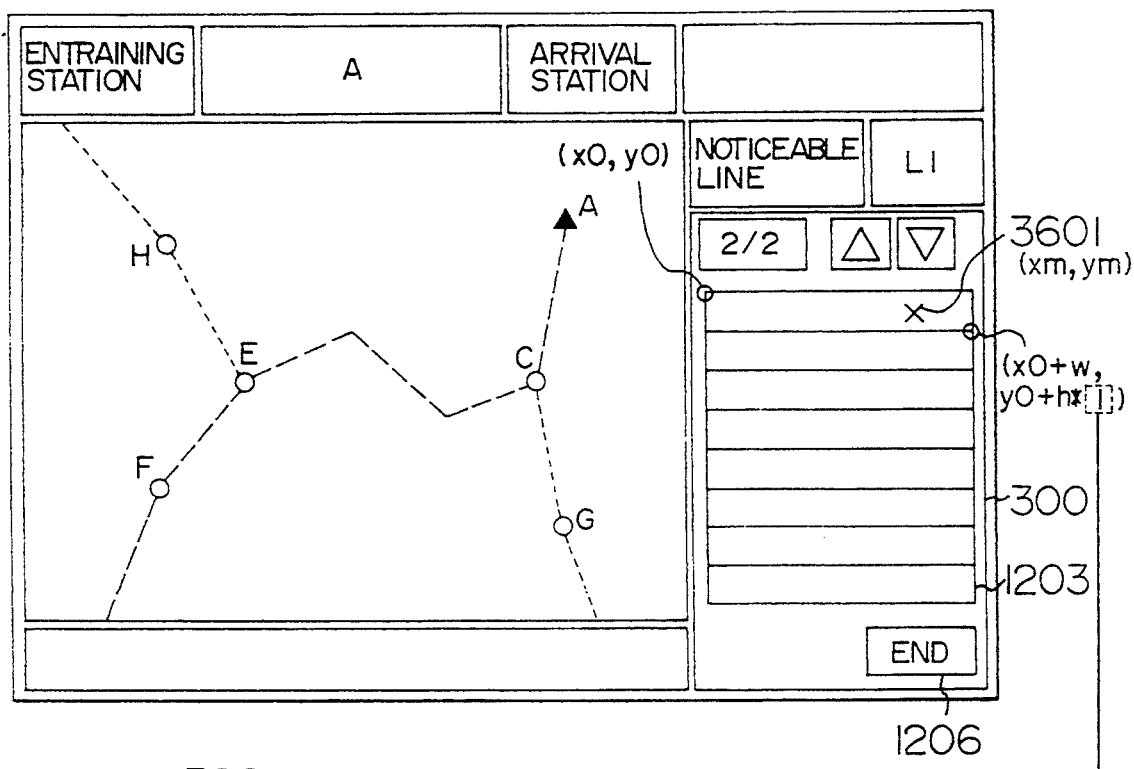
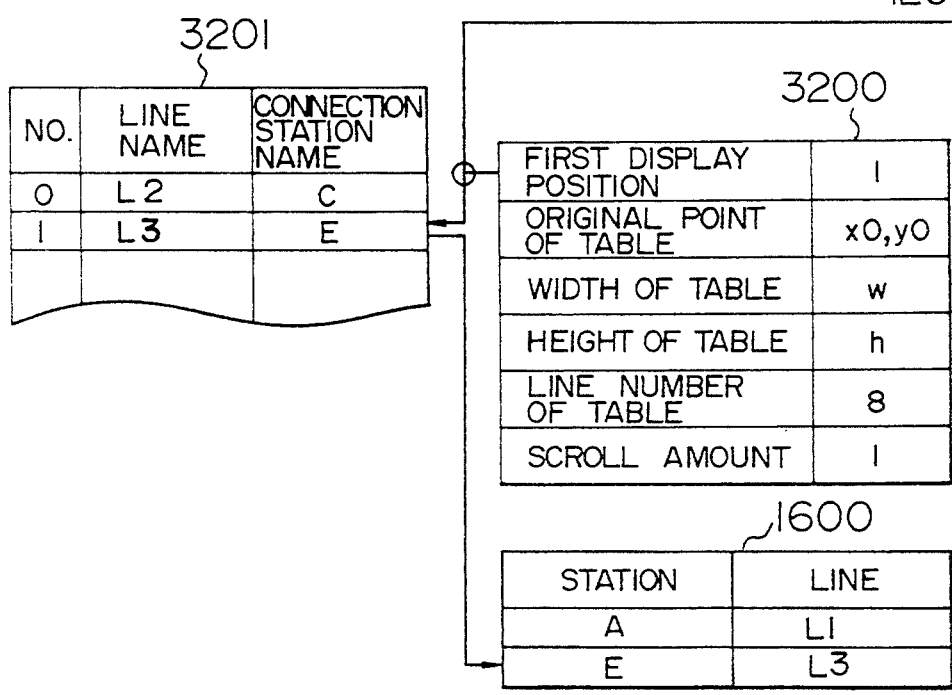

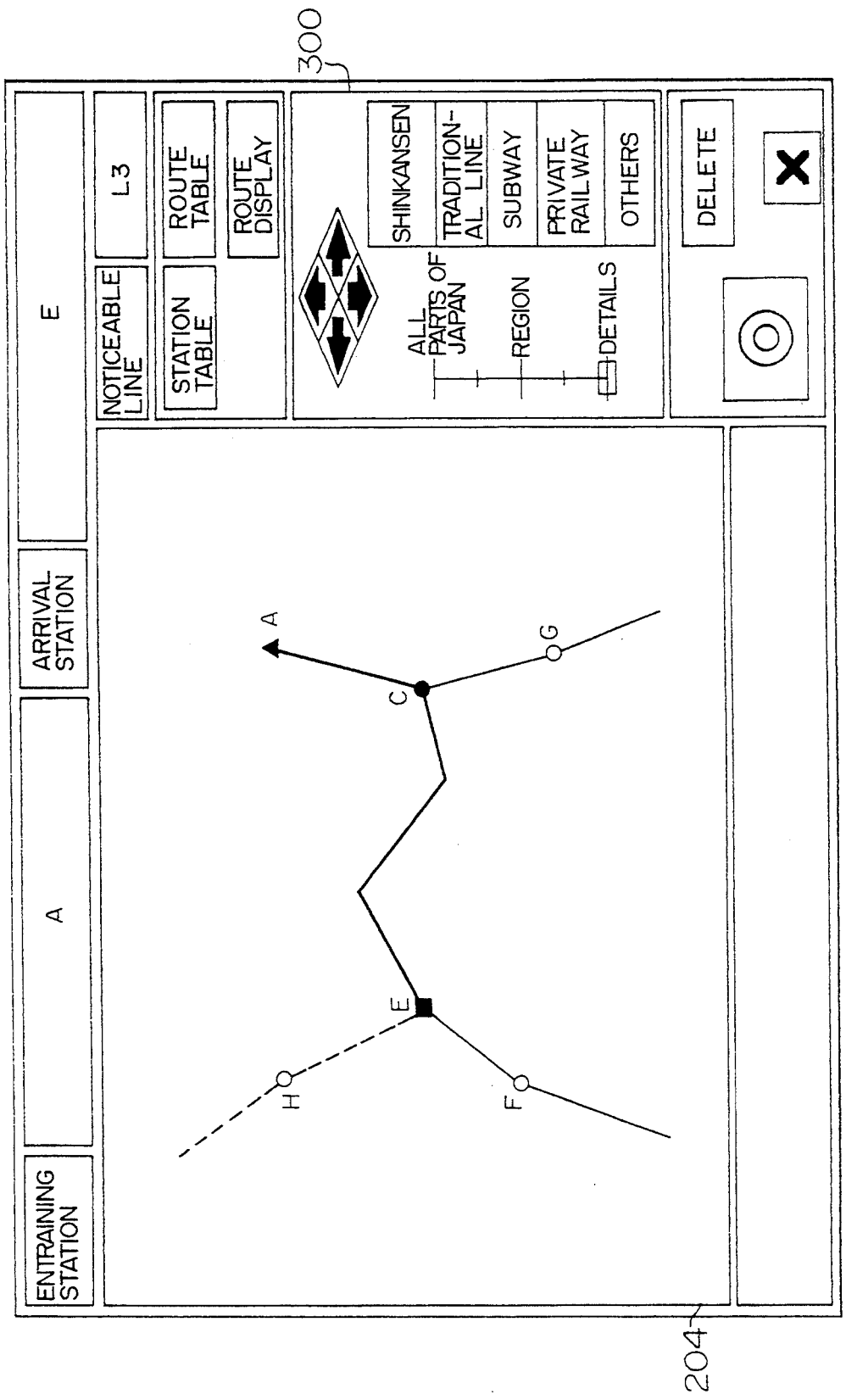

ROUTE INFORMATION INPUT APPARATUS AND METHOD THEREOF

BACKGROUND OF THE INVENTION

1. Field of the Invention

The present invention relates to route information input apparatus and method thereof and, more particularly, is directed to an information input apparatus and method thereof utilized to designate a route in a model represented by a railroad network for trains, a road network, a piping plant water flow sheet or the like in which a plurality of elements are physically set in a predetermined positional relationship or in a connection relationship and in a model such as a circulation route of circulares in an organization chart of enterprise in which a plurality of elements are logically set in a predetermined connection relationship.

2. Description of the Related Art

As one of information input apparatus for specifying a route from a starting point (entraining station) to a terminal (arrival station), there is known an information input system in which a route diagram formed by a combination of positional informations of stations (nodes) and a line segment (arc) information connecting the nodes is displayed on a screen, for example, in a two-dimensional fashion (i.e., in an XY matrix form) and the operator can sequentially select an arbitrary objective on the route diagram displayed on the screen by a pointing device.

The above system can provide a circumstance that the route diagram that was grasped as a model indicative of a physical positional relationship among a plurality of nodes is presented on the display screen and the operator can input all informations necessary to specify a route by selecting a station mark or a line mark within a displayed line diagram without consulting a train schedule or map prepared independently. This conventional system, however, poses a problem such that, if a large amount of route informations are displayed on a limited display area within the display screen such as when a line diagram of a region in which a plurality of lines are connected complicatedly or line diagram including a plurality of lines, each having a number of stations is displayed, then the route diagram displayed on the screen becomes complicated so that the operator cannot search and select an objective substantially.

SUMMARY OF THE INVENTION

An object of the present invention is to provide a route information input apparatus and method thereof in which an information input operation can be facilitated.

To achieve the aforesaid object, according to the present invention, there is provided a route information input apparatus which comprises a display screen, a pointing means for designating a position on the display screen, an information memory means and a data processing means which is operable in accordance with a program.

The memory means includes a first file in which there are stored positional informations of major node elements necessary to draw a route diagram or line diagram and a second file in which there are stored code informations representative of node elements truly existing on each line as a separate file.

According to the most specific feature of the present invention, the data processing means displays on a first area of the display screen a line diagram that is presented in the simplified form where node elements truly existing on respective lines are partly omitted. The omitted node elements are displayed on a second area of the display screen in the form of a table, if necessary. Then, the user can designate a route by selecting an arbitrary node element or line on the line diagram or on the table by the pointing means.

More specifically, according to the present invention, only node elements of a limited number such as a junction station, a major station or the like are displayed on the line diagram displayed on the first area of the display screen. The first file includes coordinate informations necessary to display these node elements on the screen as the line diagram. With respect to node elements that are not displayed on the line diagram, node elements included in the line specified last, for example, are selectively displayed in the form of a table.

According to the present invention, since the line diagram displayed on the screen is simplified, the operator can search information necessary to designate a route with ease. Further, the operator can select the node elements that are not yet displayed on the line diagram by accessing them on to the screen in the form of a table at any time.

The foregoing and other objects, advantages, manner of operation, and novel feature of the present invention will be understood from the following detailed description when read in conjunction with the accompanying drawings.

BRIEF DESCRIPTION OF THE DRAWINGS

FIG. 9A is a diagram showing a line diagram including a plurality of stations displayed on a map in actual practice;

FIG. 9B is a diagram showing an example a route diagram 204 in which stations are partly omitted and a station name table 904 of the non-displayed;

FIG. 15 is a flowchart showing a route input program;

FIG. 20 is a flowchart showing in detail the station table scroll processing in FIG. 17;

FIG. 23 is a diagram showing a displayed screen and the condition of a parameter when the selected station specifying processing is executed;

FIG. 25 is a diagram showing in detail a station mark display position determining processing in FIG. 24;

FIG. 32 is a diagram showing a displayed screen and the condition of a parameter when the line table display processing is executed;

FIG. 33 is a flowchart showing in detail the line table scroll processing in FIG. 30;

FIG. 36 is a diagram showing a displayed screen and the condition of a parameter when the selected line specifying processing is executed;

FIG. 38 is a diagram showing a screen displayed after the line table non-display processing was executed.

DESCRIPTION OF THE PREFERRED EMBODIMENT

Figure 1:
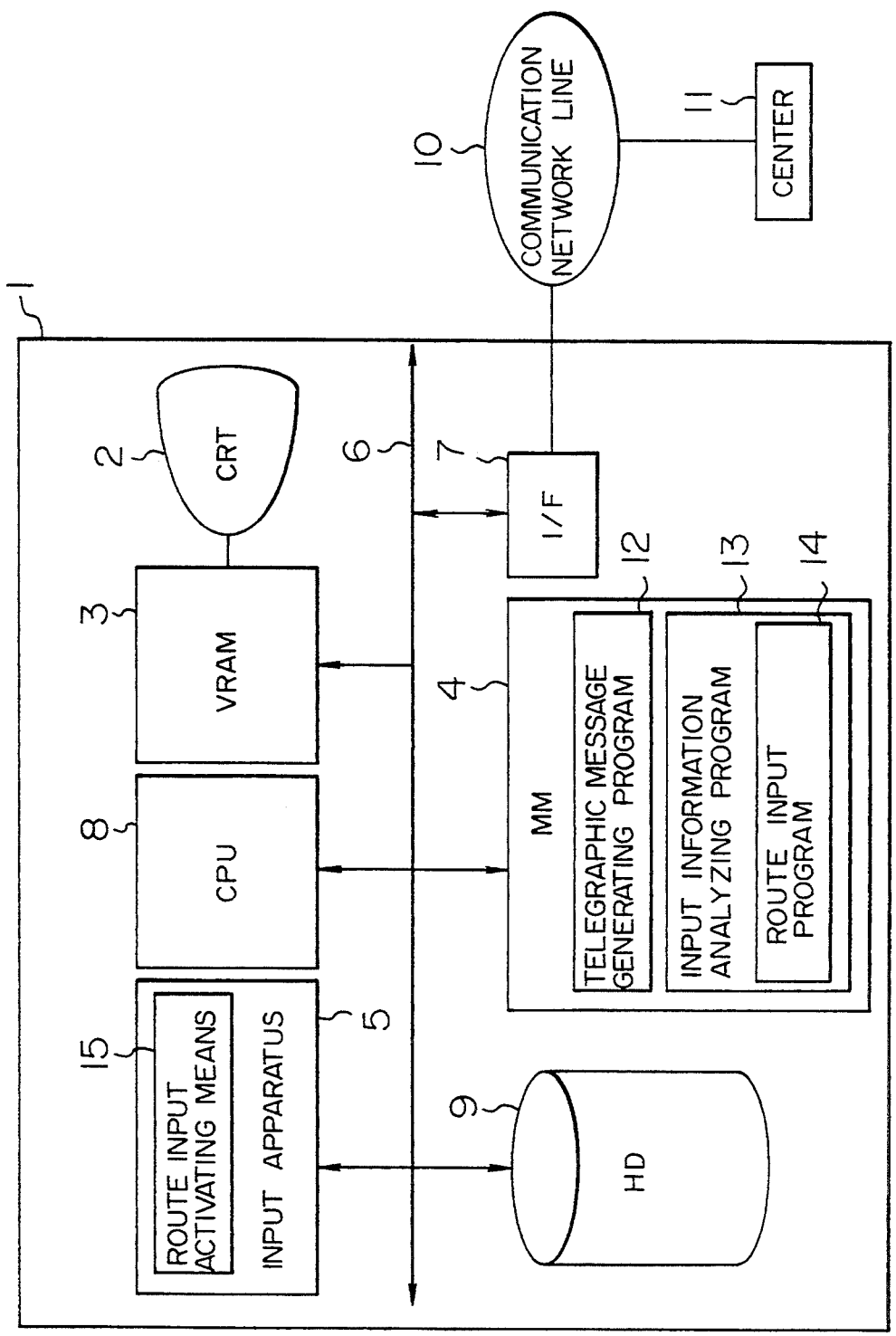
FIG. 1 is a functional block diagram showing an arrangement of a hardware of a terminal apparatus according to the present invention.

FIG. 1 of the accompanying drawings shows in functional block form an example of an arrangement of a terminal apparatus 1 that is utilized in order to input a route information.

As shown in FIG. 1, the terminal apparatus 1 comprises a display screen (CRT (cathode ray tube)) 2 used to display a route or map information, a video memory (VRAM (video random access memory)) 3 used to memorize a display content that should be output to the display screen 2, a main memory 4 for storing therein a variety of control programs, an input apparatus 5 operated by the user in order to input a route information, a central processing unit (CPU) 8 for executing a control program read out from the main memory 4, a secondary storage medium 9 formed of suitable storage media such as a hard disc or the like for storing therein an information that is utilized during the control program is executed and a system bus 6 that connects these modules one another.

According to this embodiment, a telegraphic message including a route information generated by the terminal apparatus 1 is output to a communication network line 10 through an interface module 7, if necessary and then transmitted to a central apparatus (center) 11. The center 11 analyzes a received telegraphic message from the terminal apparatus 1, processes the same in a predetermined data processing fashion and transmits the thus processed telegraphic message including an answer information to the terminal apparatus 1. In response to the content of the telegraphic message received from the center 11, the terminal apparatus 1 executes the next route information input processing or operation such as to offer a railroad ticket and a reserved ticket by means of a printer (not shown). The input apparatus 5 includes a pointing device such as a mouse, a touch-sensitive panel, a pen-point device or the like in order to instruct an arbitrary position on the CRT 2. To improve an operability, the input apparatus 5 may use a data input device such as a keyboard or the like together with these pointing devices.

The route information input apparatus is utilized to designate entraining and arrival points and a transfer line when a bus ticket, a railroad ticket or the like is offered. The route information input apparatus has a function to generate a sizable amount of information block (hereinafter referred to as a telegraphic message) together with other input informations such as a reservation of passenger seat, a car number of train, an entraining date or the like. In the description which follows, as an example of the application of the route information input apparatus, a route information input for designating a connection line of railroad in all parts of Japan will be described by way of example.

According to the present invention, a route diagram that the operator consults in order to input a route information is displayed on the CRT 2. The CRT 2 is also used to display other informations than the route diagram. To this end, the input apparatus 5 includes a route input activating means 15 in order to switch the information input screen of other information than the route information to the route information input screen.

As the route input activating means 15, there can be applied various types. For example, arbitrary types such as a system having a special physical button for accessing the route information input screen, a system in which a particular command area that is designated by a pointing device such as a mouse or the like is displayed on a part of input screen in which other information than the route information is input or system in which a command formed of a predetermined character code sequence is input by means of a keyboard or the like.

The main memory 4 prepares a telegraphic message generating program 12 and a program 13 for analyzing an input information from the operator as typical control programs. A function that characterizes the present invention can be realized by a route input program 14 forming a part of the input information analyzing program 13 and which is activated by the route input activating means 15.

Figure 2:
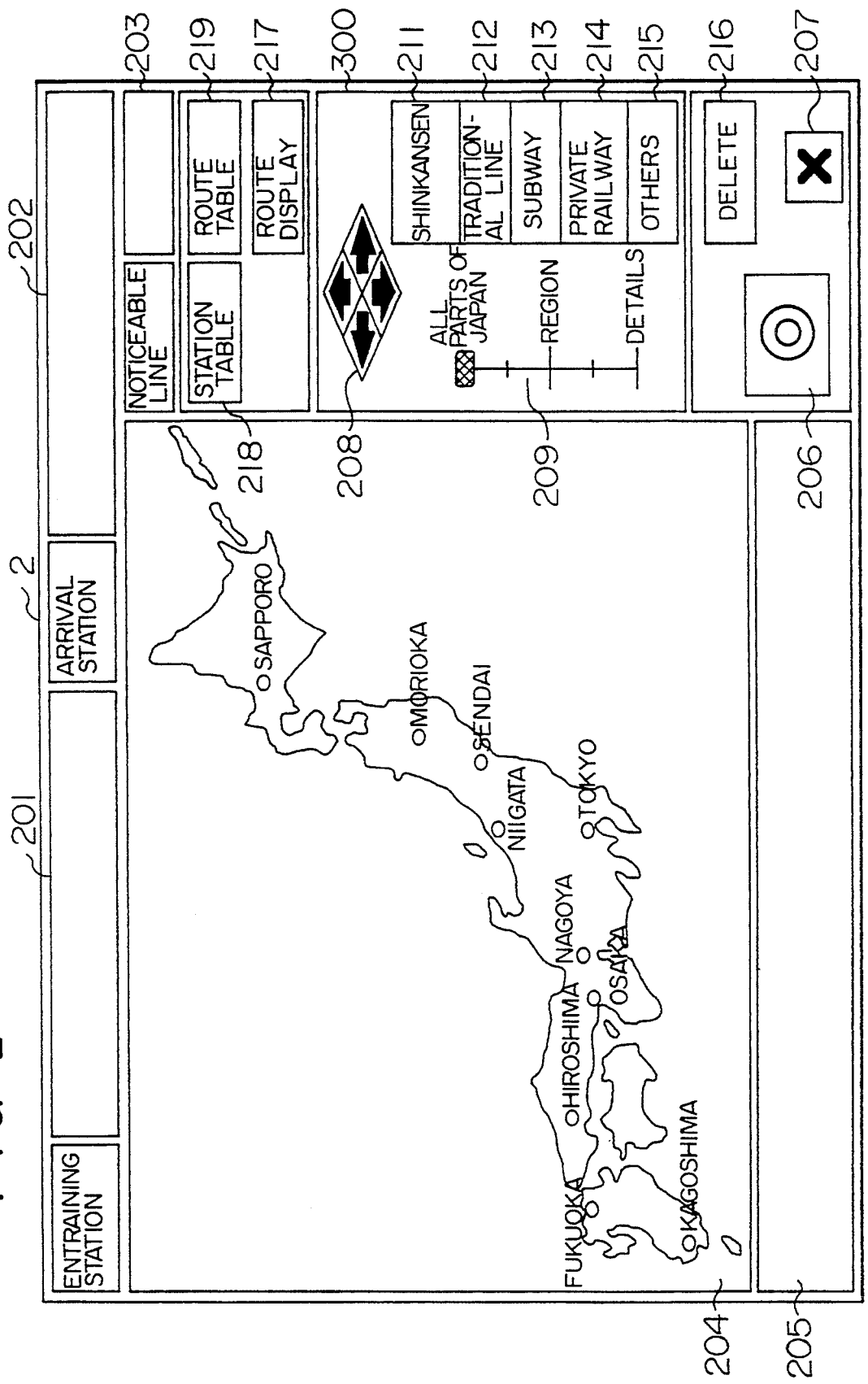
FIG. 2 is a diagram showing an initial screen of the terminal apparatus.

FIG. 2 of the accompanying drawings shows an initial screen displayed on the CRT 2 in order to input the route information. The initial screen comprises a plurality of areas which will be described below:

- area 201: "entraining station name display area" used to display a name of an entraining station designated by the operator in the route diagram display area.
- area 202: "arrival station name display area" used to display a name of an arrival station designated by the operator in the route diagram display area.
- area 203: "noticeable line name display area" that attracts the operator's attention at present.
- area 204: "route diagram display area" used to display a line diagram or route diagram. The operator can designate a route by clicking a line or station displayed on this area.
- area 205: "system message area" used to transmit a transmitted information from a host computer (not shown).
- area 206: "determined button" to be clicked when the input work is ended after the route was determined.
- area 207: "cancel end button" to be clicked when the route input work is canceled.
- area 208: "scroll button" to be clicked by a mouse when a region displayed on the route diagram display area is moved. Although the display positions can be moved fixedly in the four directions according to this embodiment, the present invention is not limited thereto and the kind/number of directions may be arbitrarily set in accordance with purposes.
- area 209: "zoom level control area" used to switch a resolution of a region displayed on the route diagram and a displayed area. The operator can watch a narrow range microscopically or watch a wide range macroscopically by controlling this zoom level control area. While the zoom level can be switched in five stages, the present invention is not limited thereto and the number of stages in which the zoom level is switched may be set arbitrarily.
- areas 211 to 215: "display line type designating buttons" to used designate the type of line to be displayed on the route diagram display area 204. While five types of lines can be independently displayed and/or not displayed according to this embodiment, the present invention is not limited thereto and the number of line types may be set arbitrarily. It is desirable that displayed colors of these designating buttons are switched in response to the display and/or non-display in order to identify the line of type that is now displayed on the route diagram.
- area 211: "SHINKANSEN button" used to determine whether or not the SHINKANSEN is displayed on the route diagram display area 204.
- area 212: "traditional line button" used to determine whether or not the traditional line is displayed on the route diagram display area 204.
- area 213: "subway button" used to determine whether or not the subway is displayed on the route diagram display area 204.
- area 214: "private railway button" to determine whether or not the private railway is displayed on the route diagram display area 204.
- area 215: "other vehicle button" used to determine whether or not a route of other vehicles such as a bus, a ship or the like is displayed within the route diagram display area 204.
- area 216: "delete button" to delete a part of route information input by the operator.
- area 217: "route display button" used to display routes that had been designated so far by the operator in the form of a table.
- area 218: "station table display button" used to display stations on the noticeable line in the form of a table.
- area 219: "line table display button" used to display diverging lines in the form of a table.

A picture area on which the above areas 206 to 209 are displayed is defined herein as "command area 300" in order to understand the present invention more clearly.

A route designating operation procedure and the condition that the displayed content on the screen is changed with the route designating operation procedure will be described.

Figure 3:
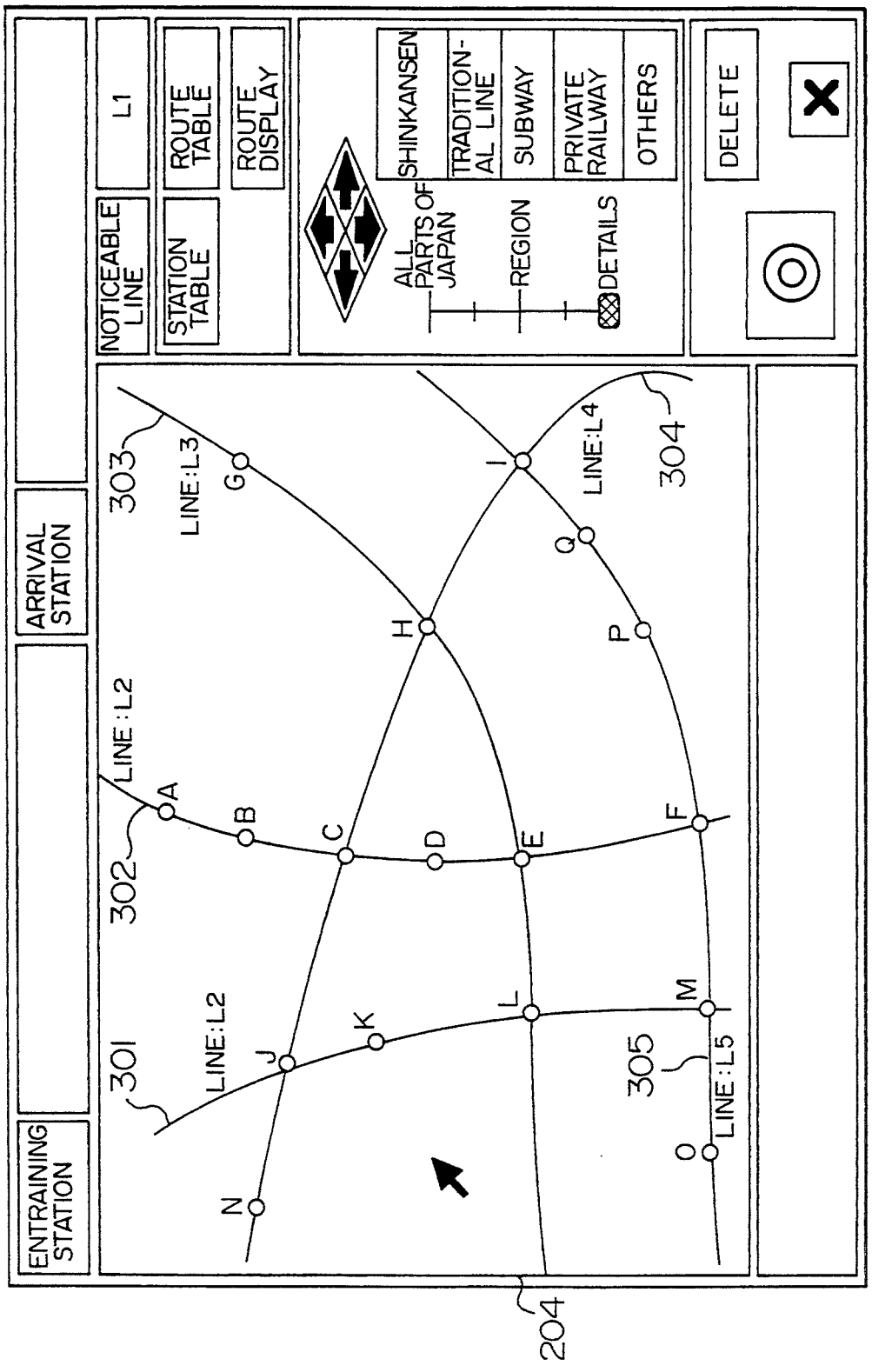
FIG. 3 is a diagram showing an initial screen when an route information is input.

FIG. 3 of the accompanying drawings shows an example of a screen when the operator starts to input a route information.

This screen is an initial screen shown in FIG. 2. By operating the zoom level control area 209, a designating frame of a size corresponding to the zoom level is generated on the whole map displayed on the route diagram display area 204. Then, this designating frame is moved by a mouse and located at a desired position. When the operator instructs the end of the locating operation of the designating frame by the mouse, a route diagram (line diagram) of the map area within the designating frame appears on the route diagram display area 204 instead of the whole map as shown in FIG. 3.

The displayed content on the screen can be changed by operating the scroll button 208. It is desirable that the kind of line displayed at that time was previously designated by operating the buttons 211 to 215 on the initial screen. When any special line type designating operation is not carried out by the operator, a default may be designated so that the traditional line or SHINKANSEN line is displayed automatically.

According to this embodiment, the route diagram is composed of station marks and line segments representative of lines. Station names are represented by reference symbols A through Q and station marks are represented by open circles.

When the station mark is displayed, if the expression form of the displayed station mark is properly changed so that a station designated as an entraining station, an arrival station etc., or particular station can be discriminated from other stations, then the operator can easily understand the selection of route or input situation of route information.

Lines are indicated by a curved lines 301 (line: L1), 302 (line: L2), 303 (line: L3), 304 (line: L4) and 305 (line: L5) each of which connects the stations. Alternatively, the lines may be expressed by connecting the stations by straight lines in order to improve a drawing speed. According to this embodiment, the expression form of line segments representative of lines is changed depending upon the kind of line and the selected condition so that the operator can understand the working situation with ease.

Figure 4:
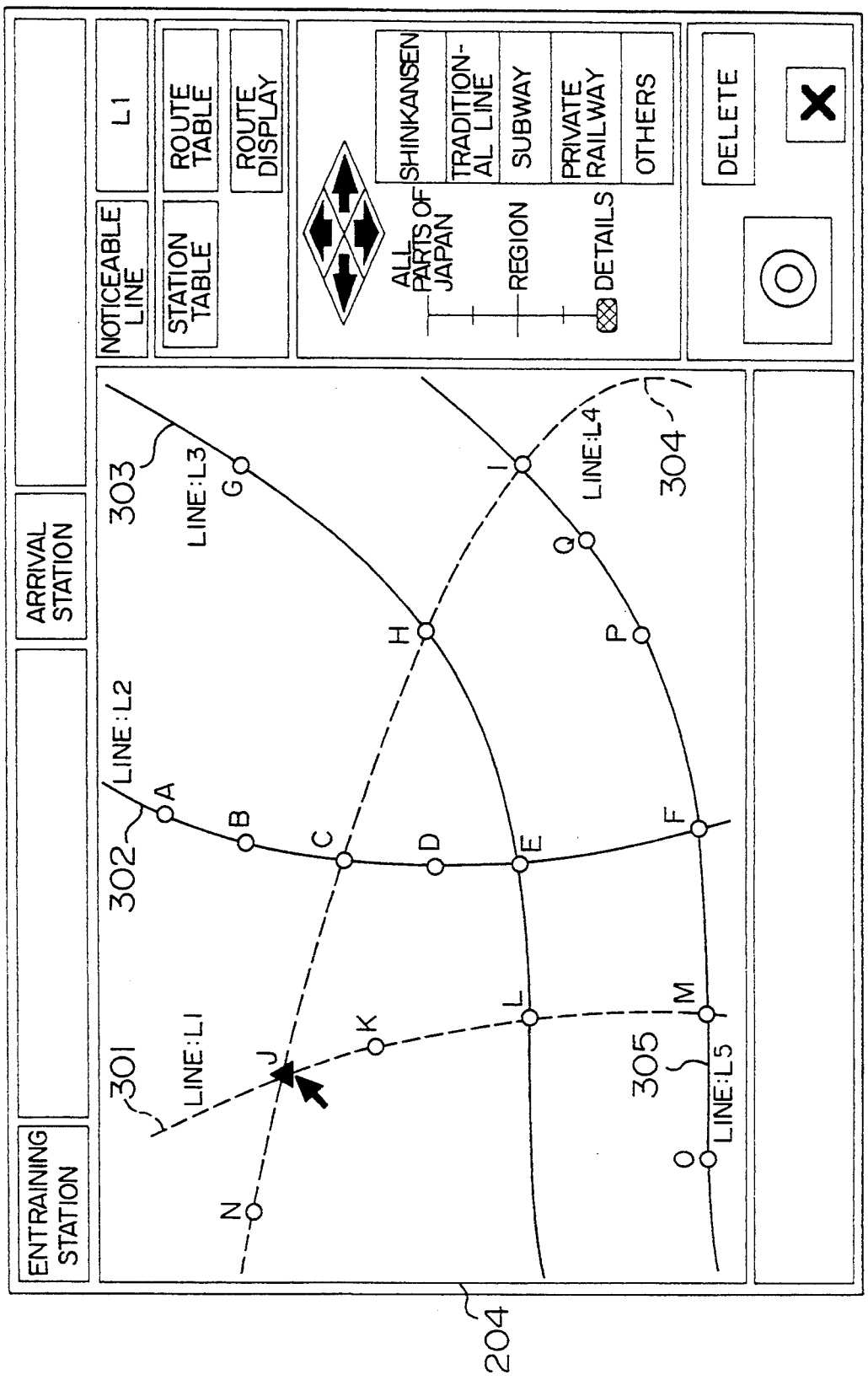
FIG. 4 is a diagram showing a first screen during a route information is input.

When the user selects the station J by the input device 5, for example, in the route diagram display area 204, the screen is changed to the condition shown in FIG. 4 of the accompanying drawings. The station mark and the station name may be selected by the pointing device in order to select the station. While a station that the operator designates first on the line diagram is automatically treated as "entraining station" as described above, the present invention is not limited thereto and the following variant is also possible. That is, after the input mode was set to "entraining station input mode" by selecting the entraining station name display area 201, for example, a station input first may be treated as the entraining station. According to the latter system, although the number of operation is increased, the operator can determine input items of his own will. Therefore, depending on the operator's convenience, the arrival station name display area 202 may be selected first to designate the arrival station, whereafter the entraining station may be designated.

When the station J is selected on the display screen of FIG. 3, the selected station J is changed into a display form (solid triangle) representative of the entraining station as shown in FIG. 4. At that time, the display form of lines that the passengers can get on from the station J, i.e., lines 301 (L1) and 304 (L4) is changed from a fine solid line representative of the normal condition into a fine broken line representative of nominated lines that can be selected on the route. The nominated line will hereinafter be referred to as a "diverging line". The control operation of the displayed condition of stations and lines on the picture screen will be described later on more fully. When the display screen is changed into the state shown in FIG. 4, an operation done by the user for selecting other lines (e.g., lines L2, L3, L4 and L5) than the above diverging lines L1, L4 becomes invalid.

Figure 5:
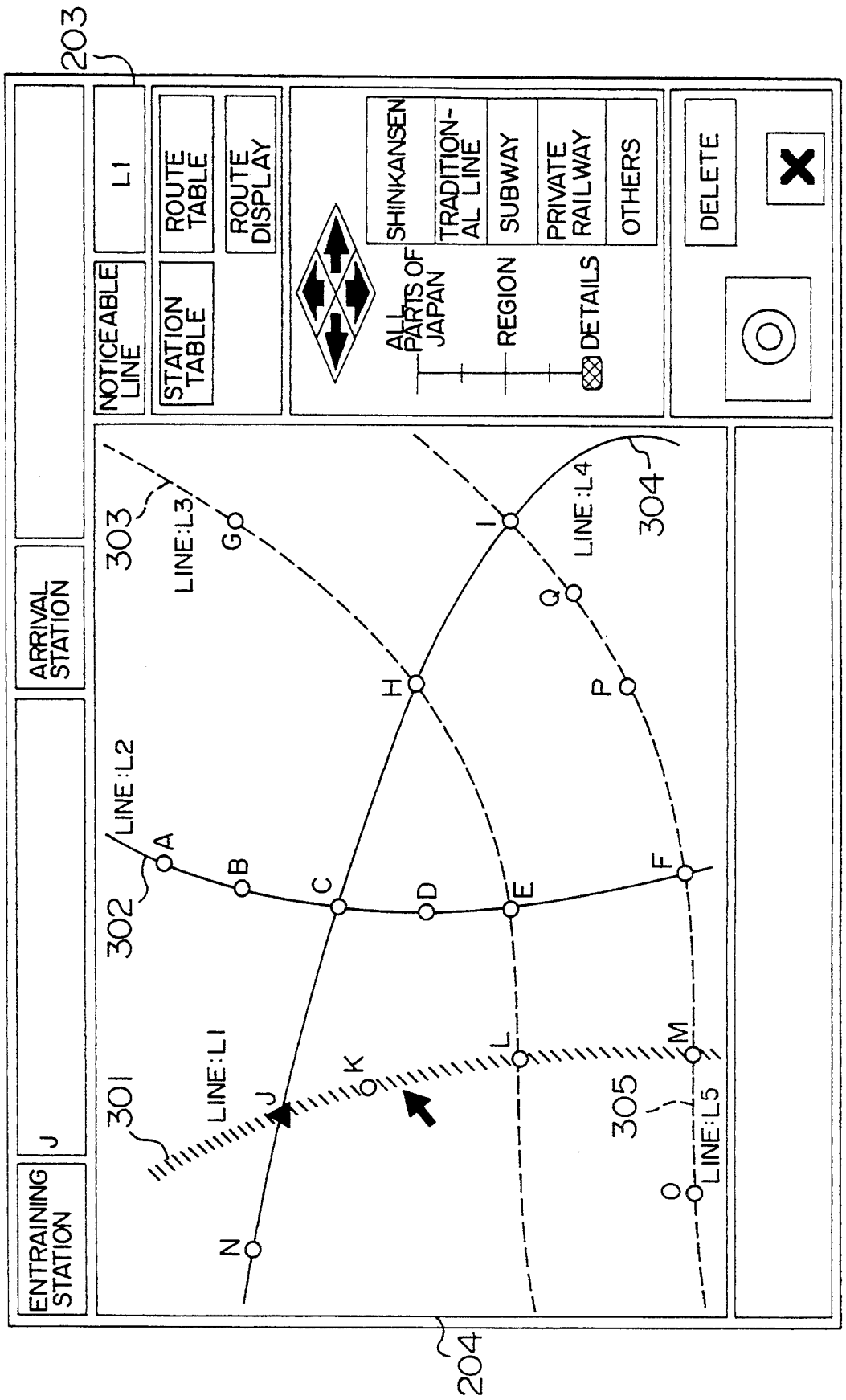
FIG. 5 is a diagram showing a second screen during a route information is input.

Assuming that the operator selects the line 301 (L1) from the diverging lines, then as shown in FIG. 5 of the accompanying drawings, a name "line L1" of the above line 301 is displayed on the display area 203 representative of "noticeable line" and the display form of the line 301 is changed into a display form (bold broken line) so that the line 301 can be distinguished from other lines in the route diagram. Of the lines connected to the line 301, the line 303 (L3) and the line 305 (L5) where the transfer becomes possible at other stations than the station J are set to new diverging lines and the display form of these diverging lines 303 (L3) and 305 (L5) is changed from the fine solid line into the fine broken line. Conversely, the line 304 (L4) that was not selected before is returned to the display form (fine solid line) of the normal line from the display form (fine broken line) of the diverging line.

Figure 6:
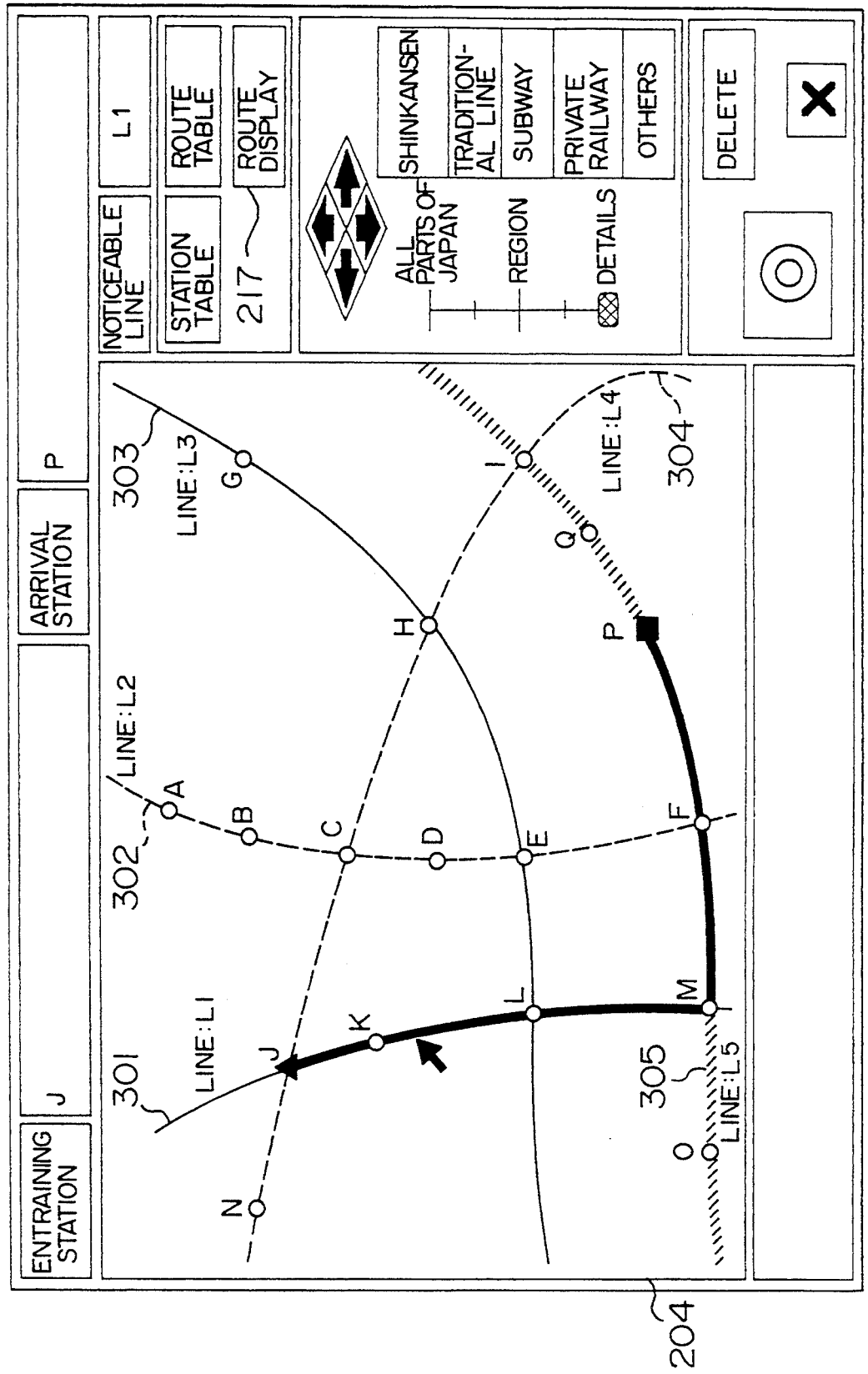
FIG. 6 is a diagram showing a determined screen of the route input information.

Assuming that the operator designates a certain station P on the diverging line 305 (L5) in the display screen of FIG. 5, then the designated station P is treated as "arrival station" and the display screen is changed into a "route determined screen" shown in FIG. 6 of the accompanying drawings. On the route determined screen, the display form of the station mark indicative of the station P is changed into a display form (solid square) that represents the arrival station. Also, a display form of a section from the station J on the line 301 (L1) to the junction station M to the line 305 (L5) and a display form of a section from the station M on the line 305 to the arrival station P are changed into the display form (bold solid line) that represents a "determined route".

Figure 7:
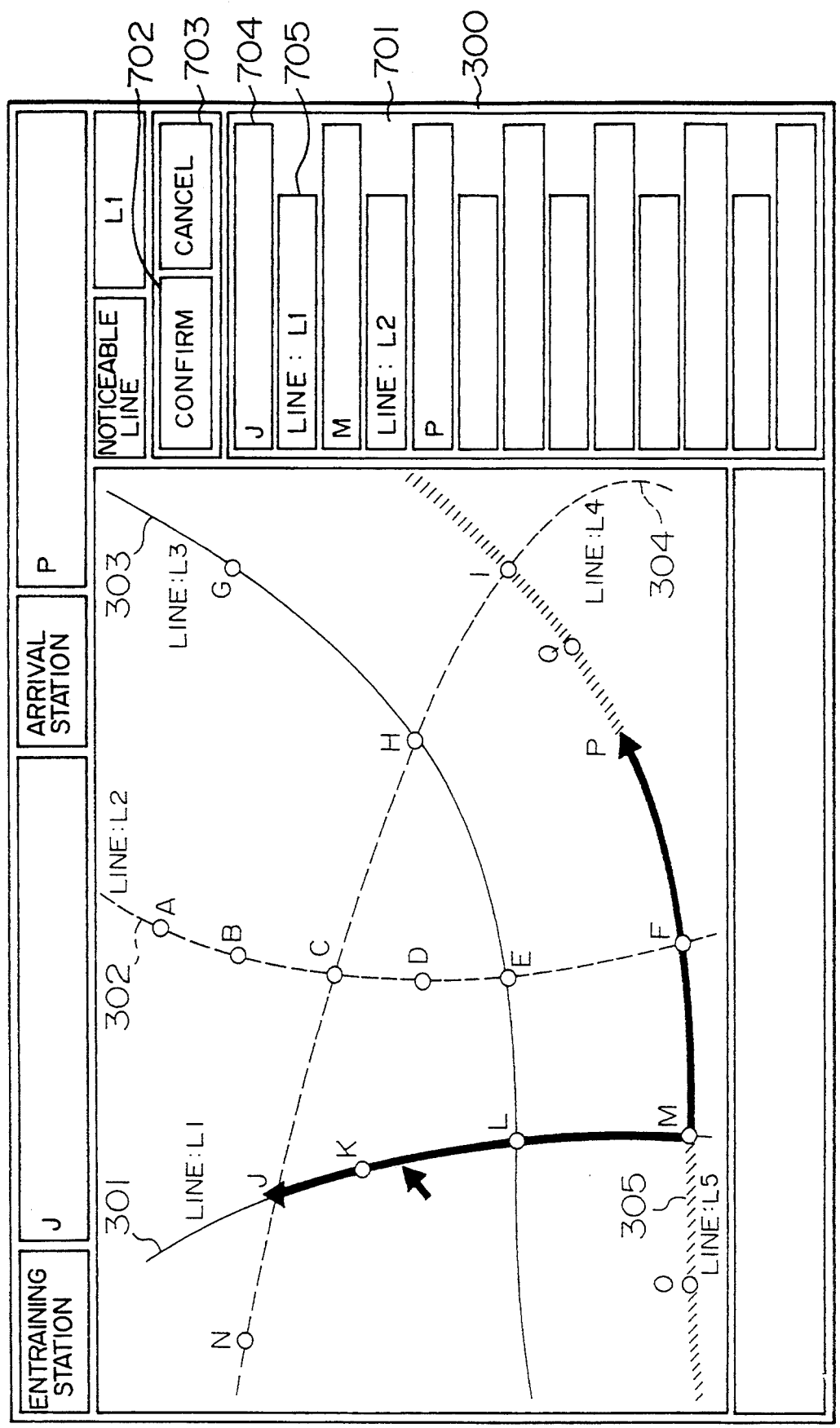
FIG. 7 is a diagram showing a displayed screen of a route information table.

When the operator wants to confirm the input route, the operator selects "route display button" 217. When the route display is designated, the command area 300 on the display screen is changed into "route display screen" shown in FIG. 7 of the accompanying drawings. On the route display screen, there is shown a route display column 701. On this route display column 701, a station name display area 704 representative of the entraining station or junction station and a line name display area 705 are alternately displayed in accordance with the sequential order that the passengers get on the train, in addition to a confirmation button 702 and a cancel button 703.

When the operator selects the confirmation button 702, the screen returns to a screen displayed just before the route display screen is displayed. When the cancel button 703 is selected, routes that had been designated so far are all cleared and the screen returns to the input start screen shown in FIG. 3. The above control operation that can realize the changes of the screen will be described below.

Figure 8:
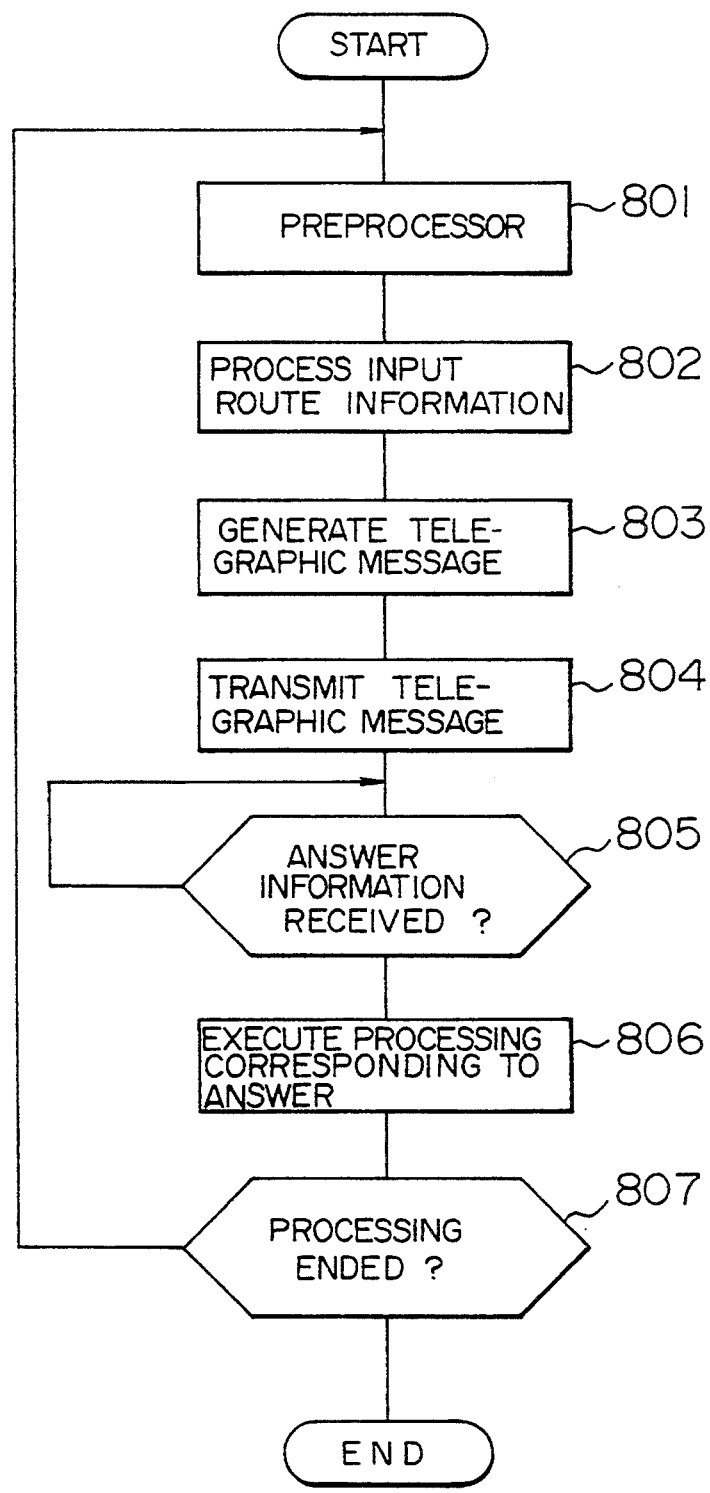
FIG. 8 is a flowchart showing an outline of operation of the route information input apparatus according to the present invention.

FIG. 8 of the accompanying drawings is a flowchart to which references will be made in explaining an outline of a control program executed by the terminal apparatus 1.

step 801: As a preprocessor, process other informations than the route information input by the user, e.g., informations representative of whether or not a passenger seat is a no-smoking car, whether or not a railroad ticket is a round-trip ticket, the number of tickets or the like. In step 801, a part of entraining station and route may be input.

step 802: Process the route information input by the user according to the route input program that characterizes the present invention. When the route input program is activated by the route input activating means 15, the route diagram is displayed on the CRT 2 and the apparatus is enabled so that the route information can be input. Steps 801 and 802 may be changed one from the other during the processing.

step 803: Generate an inquiry telegraphic message including the route information specified at step 802 and which can reserve a railroad ticket.

step 804: Transmit a telegraphic message thus generated to the center 11.

step 805: Await an answer information to the transmitted telegraphic message from the center 11. If the answer information is received, then the processing proceeds to the next step 806.

step 806: Execute the processing according to the answer information from the center 11, e.g., a print of railroad tickets, a sale of railroad tickets, etc.

step 807: If the end of the processing is instructed, then this routine is ended. If not, then the processing returns to the first step 801.

According to the present invention, by the route input program executed in step 802, a simplified line or route diagram (hereinafter referred to as "route diagram" and the table including the route specifying informations corresponding to the route diagram are simultaneously displayed on the display screen and the user can designate a route in accordance with these route diagram and table displayed. More specifically, a route diagram including only major stations such as junction stations or the like in a number of stations truly existing in one region is displayed on the route diagram display area 204, which can avoid the displayed content from becoming complicated. Further, in order that the user can designate an arbitrary station omitted in the route diagram display area 204, "station table" including a plurality of station names that belong to the line specified last by the user is displayed on the command area 300 and the user can select the stations necessary to specify the route from this table.

An example of a route diagram output on to the display screen and in which several stations are omitted according to the present invention will be described with reference to FIGS. 9A, 9B of the accompanying drawings.

According to the present invention, as shown in FIG. 9A, for example, a region 901 on a map where the stations A through J exist in actual practice is output on to the display screen as a route diagram 902 of the form such that, as shown in FIG. 9B, only the major stations B, F and I are included and that other stations A, C, D, E, G, H, J and K are omitted. In the specification of the present invention, the station omitted on the route diagram will be referred to as "non-displayed station".

In the present invention, in order that the non-displayed station belonging to the line L1 selected on the route diagram 902 can be selected as a route information, a plurality of non-displayed station names are displayed on the command area 300 in the form of a table 904 and the user can select necessary stations from these non-displayed stations by the input apparatus 5. On the command area 300, there are formed, in addition to the above station table 904, scroll designating areas 905a, 905b used to scroll the contents of the station table 904, a first station number display area 906 used to display the station number displayed on the first line of the station table 904 and a station table end area 907 used to delete the station table area 903.

Figure 10A:
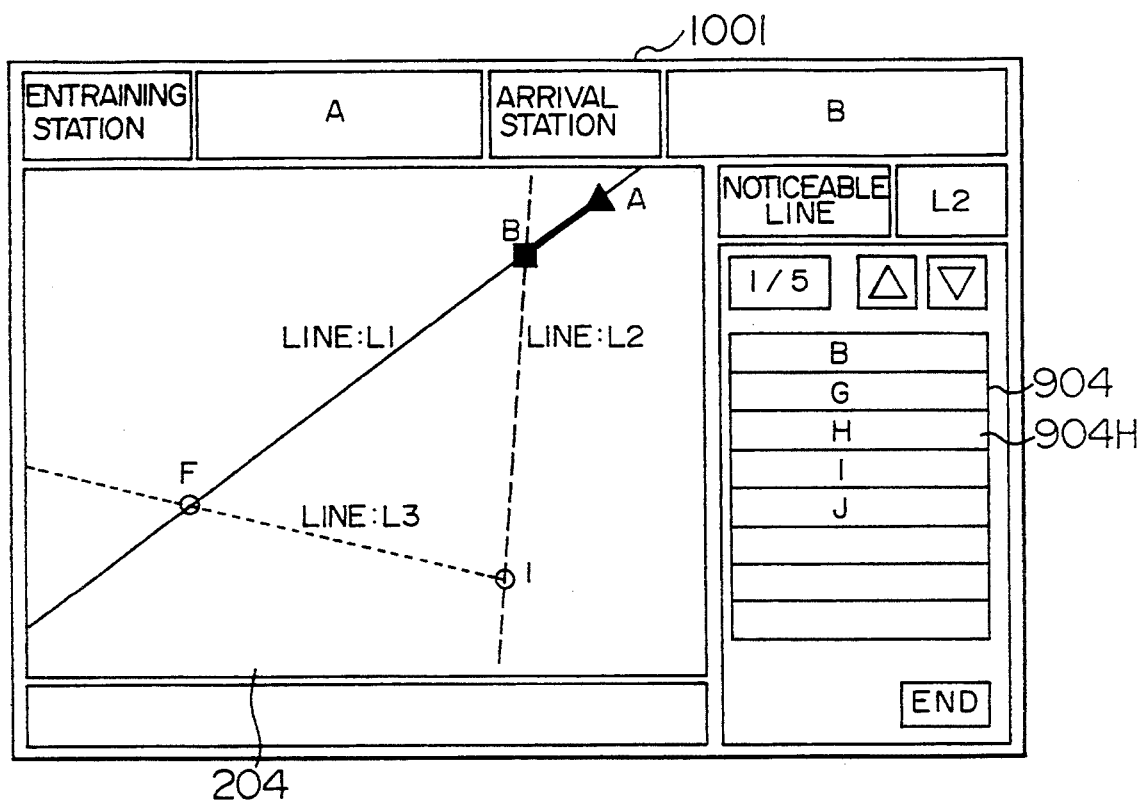
FIGS. 10A and 10B are diagrams used to explain the condition that the route diagram is changed when a non-displayed station is selected.
Figure 10B:
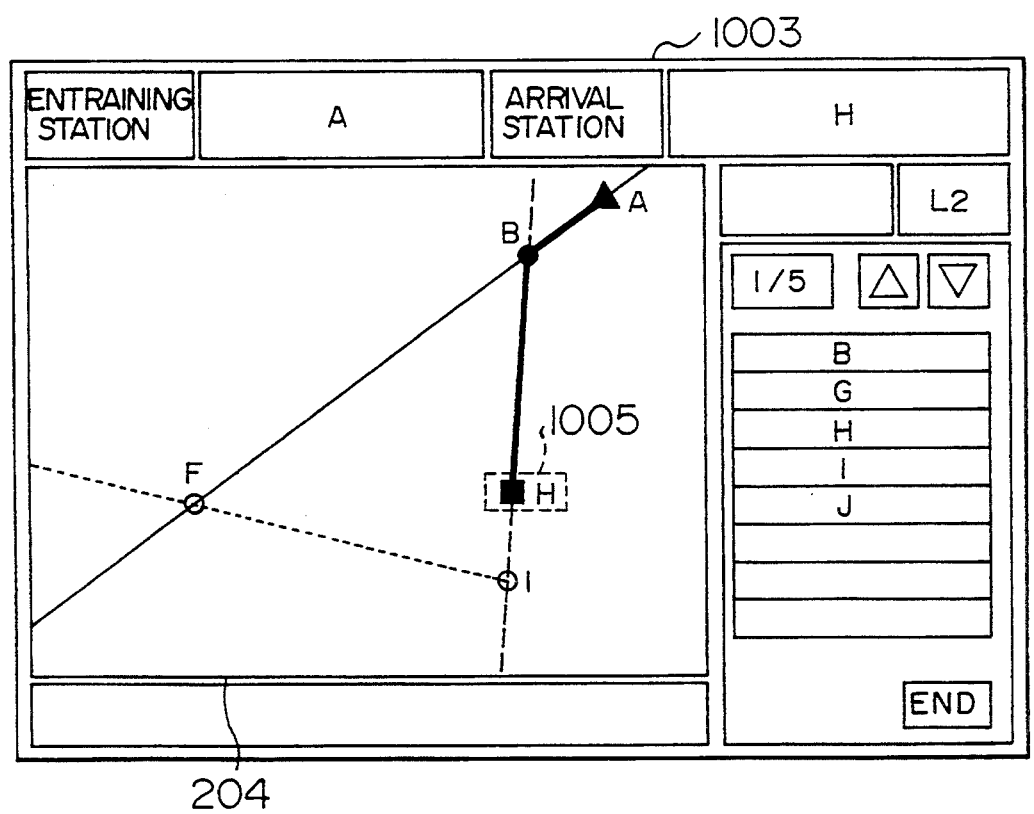

FIGS. 10A and 10B show an example that the route diagram is changed when a station that is not displayed on the route diagram 902 is selected by the station table 904 in order to specify the route. A display screen 1001 illustrates the condition such that the station A included in the map 901 shown in FIG. 9A is selected as the entraining station and that a section from "line L1" to "station B" to "line L2" is selected as a route. At that time, names of stations existing on the selected line L1 are displayed on the station table 904.

When a non-displayed station H (904H) is selected from the station table 904, the display screen 1001 is changed into a screen 1003 shown in FIG. 10B. On the route diagram display area 204, there are displayed a mark and a station name 1005 at a proper position between the stations B and I of the line L2 in order to indicate the station H. The display position of the non-displayed station may be determined by some suitable methods, such as a method in which coordinate data are allocated to the non-displayed stations in advance and a method in which a display position is obtained by a proper coordinate calculation from coordinate data (coordinate data of the stations B and I in the example of FIGS. 10A, 10B) ahead of and behind the non-displayed station.

In order to make the route diagram easier to see, according to the embodiment of the present invention, a shape of a line on the vector map that results from connecting coordinate data of display stations is corrected by adding a "dummy station" formed of only coordinate data to the route diagram.

Figure 11A:
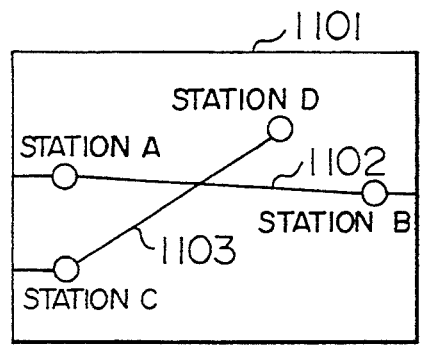
FIGS. 11A and 11B are explanatory diagrams used to explain a dummy element that is used to draw a line, respectively.

By way of example, in FIG. 11A of the accompanying drawings, a route diagram 1101 that is not yet corrected is displayed in the form such that a line 1102 connecting the stations A and B and a line 1103 connecting the stations C and D cross each other. A route diagram 1104 after being corrected displays the condition that the above crossing is removed by adding a dummy station 1105 to the line connecting the stations A and B.

Figure 11B:
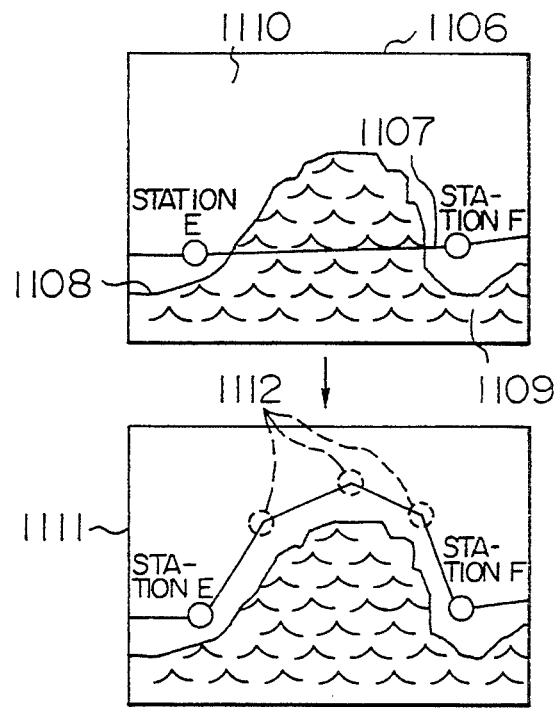

In FIG. 11B, a route diagram 1106 shows a route diagram before being corrected under the condition such that a line 1107 connecting the stations A and B crosses a line 1108 representative of a coastline and the line 1107 is located on a sea region 1109. A route diagram 1111 shows the condition such that the line 1107 is corrected so as to be located within a land 1110 by adding three dummy stations 1112 to a line connecting the stations A and B.

In order to input the route information more easily, according to the embodiment of the present invention, lines diverging from the selected line are displayed in the form of a table (hereinafter referred to as "line table") if necessary. Thus, the user can select a line forming a part of the route from the above line table.

Figure 12:
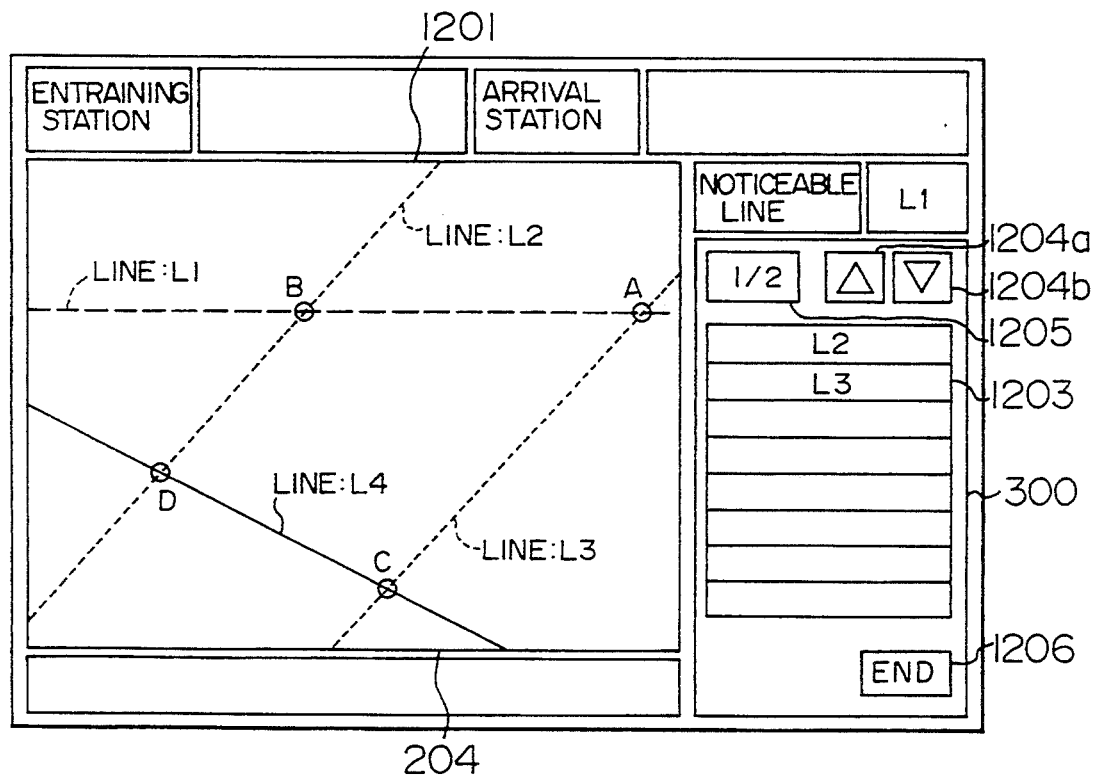
FIG. 12 is a diagram showing an example of a displayed screen of a line table.

FIG. 12 of the accompanying drawings shows an example of a route input screen on which there is displayed the above line table.

This example of FIG. 12 shows the condition such that a route diagram 1201 including the line L1 as "selected line", the lines L1, L3 as "diverging line" diverging from the line L2 and the line L4 as "ordinary line" is displayed on the route diagram display area 204. When the user wants to select the diverging line L2 or L3 diverging from the selected line L1, the user selects the line L1 or L3 that is now displayed on the route diagram display area 204 by the input apparatus 5. Alternatively, a line table 1203 is displayed on the command area 300 and the user selects a necessary line from the line table 1203 by the input apparatus 5.

On the command area 300, there are displayed, in addition to the above line table 1203, a scroll designating area 1204 used to scroll the contents of the line table 1203, a starting line number display area 1205 used to display the line number displayed on the first line of the line table 1203 and a line table end area 1206 used to clear the line table area.

FIGS. 13A through 13E of the accompanying drawings show arrangements of four files 1303 to 1306 provided in order to realize the above-mentioned display function of the present invention and to which references will be made in explaining a relationship between an actual line diagram 1301 and a line diagram 1302 that is displayed on the screen. Each of the files 1303 to 1306 comprises a key unit and a data unit and can read data corresponding to a certain key by designating a certain key. In this example, each file stores therein data such that the stations B and D are omitted from the actual route diagram 1301 shown in FIG. 13A and two dummy stations are placed between the stations C and E to thereby display the route diagram 1302 shown in FIG. 13B on the screen.

Figure 13A:
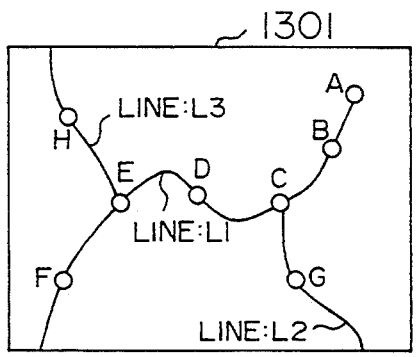
FIGS. 13A through 13F are diagrams used to explain data files 1303 to 1306 that are used in the present invention in order to display by way of example an actual line diagram 1301 (FIG. 13A) as a route information input line diagram 1302 (FIG. 13B)
Figure 13B:
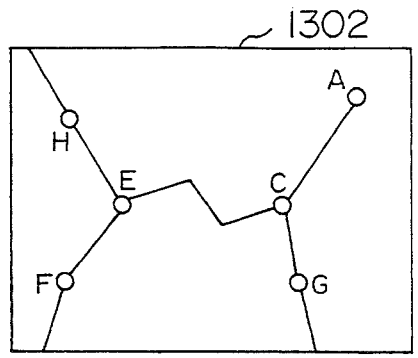
Figure 13C:
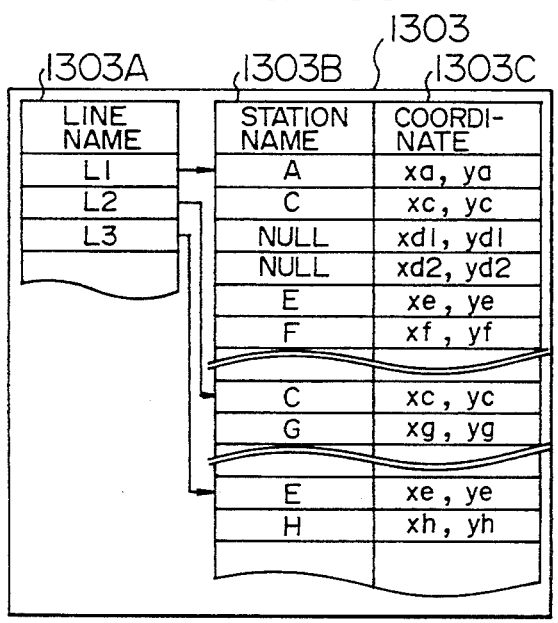

The "drawing station coordinate file" 1303 shown in FIG. 13C is used to store therein informations necessary to display the route on the route diagram display area 204. The file 1303 has station name data 1303B of stations (including dummy stations) to be displayed on the route and coordinate data 1303C indicative of the display position in association with the line name 1303A. With respect to the dummy station, the station name 1303B is set to NULL.

Figure 13D:
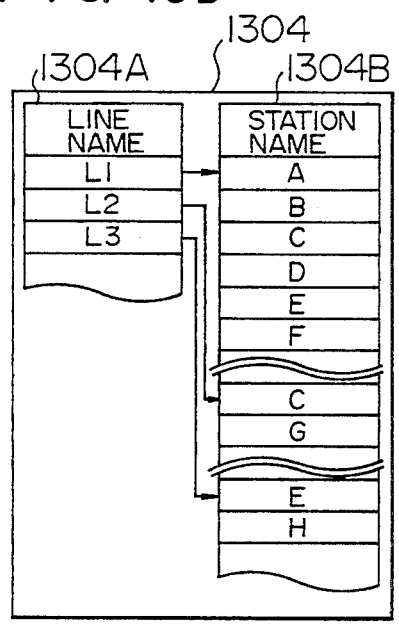

The "station name file" 1303 shown in FIG. 13D is used to store therein informations necessary for the station table and has station name data 1304B of all stations (except dummy stations) in association with the line name 1304A.

Figure 13E:
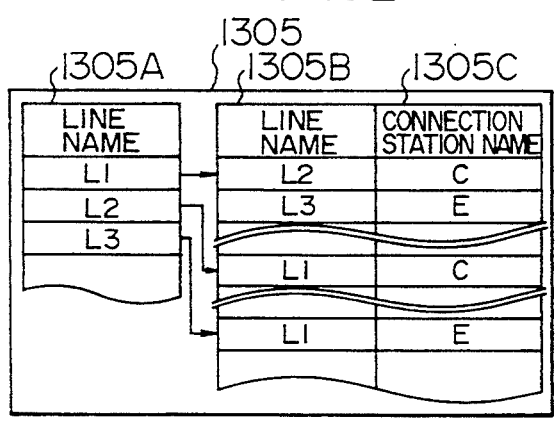

The "line—diverging line file" 1305 shown in FIG. 13E is used to store therein informations necessary for the line table and has line name data 1305B of lines diverging from the line and station name data 1305C which serving as connecting points with the diverging lines in association with the line name 1305A.

Figure 13F:
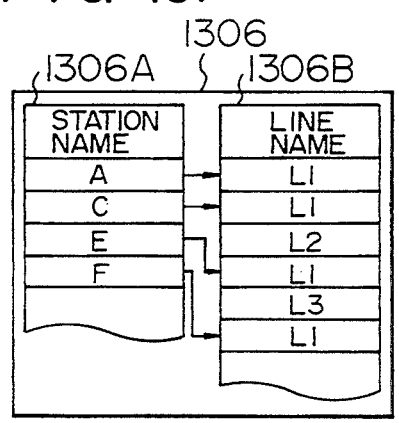

The "station—diverging line file" 1306 shown in FIG. 13F has line name data 1306B representative of lines diverging from the station of the station name 1306A in association with the station name 1306A.

Figure 14:
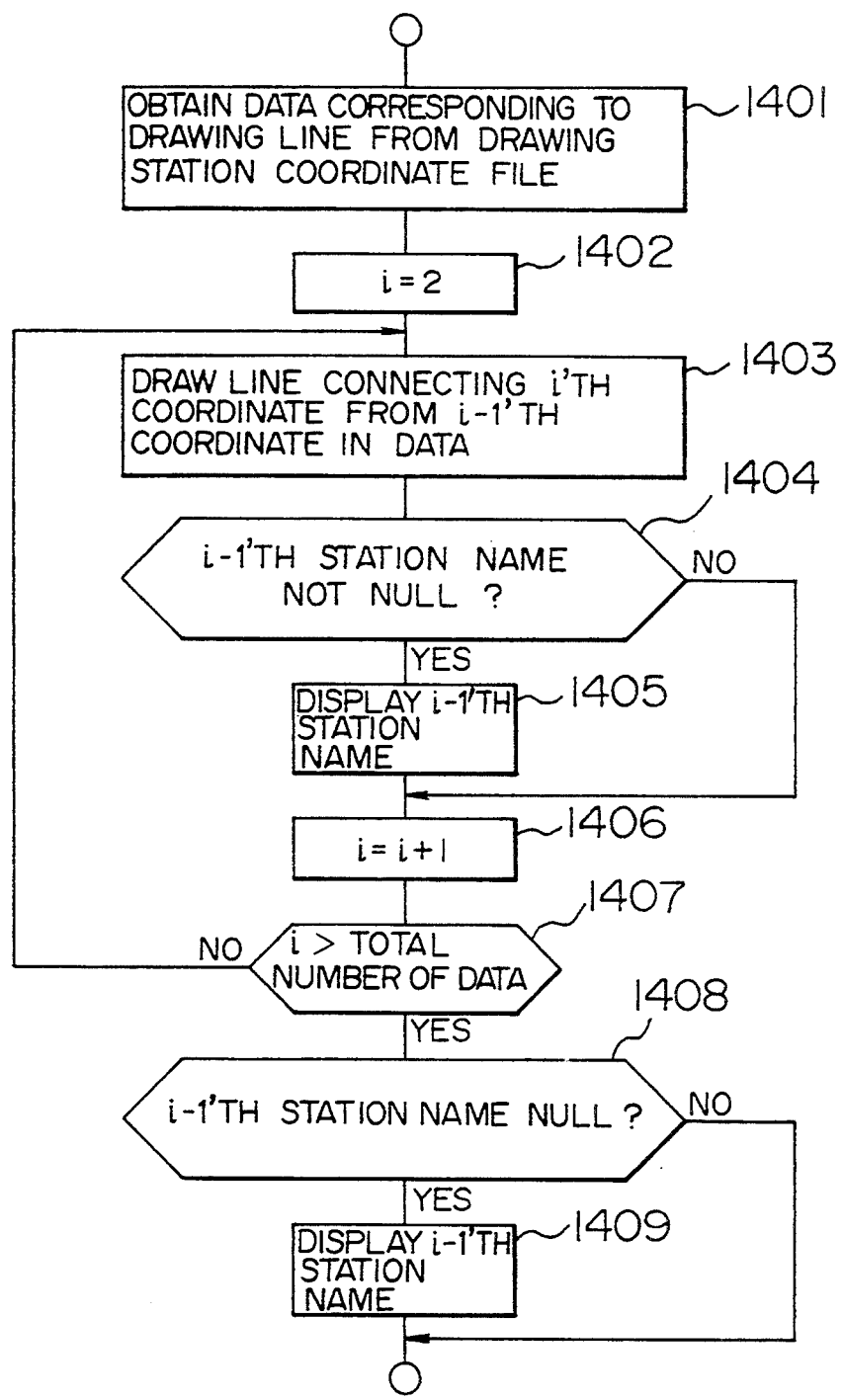
FIG. 14 is a flowchart to which references will be made in explaining a line drawing processing.

FIG. 14 of the accompanying drawings shows a program flowchart that is used to draw a certain line on the route diagram display area by using the informations of the drawing station coordinate file 1303.

step 1401: Obtain data corresponding to a line to be drawn from the drawing station coordinate file 1303.

step 1402: Initialize a parameter i representative of a data number to 2.

step 1403: Draw a line connecting i'th coordinate from i-1'th coordinate in the data thus obtained at step 1401.

step 1404: Determine whether the i-1'th station name is not NULL. If it is determined that the i-1'th station name is not NULL, then the processing proceeds to step 1405.

step 1405: Display the i-1'th station name at i-1'th station name display position on the route diagram.

step 1406: Increment the parameter i representative of the data number by 1.

step 1407: Determine whether or not the parameter i is larger than the total number of data read out in step 1401. If it is determined that the parameter i is larger than the above total number, then the processing returns to step 1403.

step 1408: Determine whether or not the i-1'th station name is NULL. If the i-1'th station name is not NULL as represented by a YES at decision step 1408, then the step 1409 is executed.

step 1409: Display the i-1'th station name at the i-1'th station name display position on the route diagram.

FIG. 15 of the accompanying drawings shows a basic flow of the route input program shown in FIG. 14.

At initialization processing step 1501, an initial screen is generated and necessary informations are read out. At step 1502, the route information input apparatus awaits the input of data by the input apparatus 5. When data is input by the input apparatus 5, the processing proceeds to the next step 1503, whereat the input content is analyzed. Then, the following processing is executed in accordance with the analyzed result.

If it is determined in decision step 1504 that the input content is "determined", then the route input processing is ended. If it is determined in decision step 1505 that the input content is "station table", then the next station table processing 1506 is executed, whereafter the processing returns to step 1502 to await the input of data by the input apparatus 5.

If it is determined in decision step 1507 that the input content is "line table", then the processing proceeds to the next step 1508, wherein the line table processing is executed, whereafter the processing returns to step 1502 to await the input of data by the input apparatus 5.

If the input content is other one than those described above, then the processing proceeds to step 1509, wherein each processing corresponding to the input content is executed, whereafter the processing returns to step 1502 to await the input of data by the input apparatus 5. During the steps 1501, 1506 and 1508 are executed, the line drawing flow shown in FIG. 14 is executed in the line drawing processing.

As examples that the user operates the route information input apparatus of the present invention in actual practice, the operation (1) for selecting a station on the selected line consulting the station table and the operation (2) for selecting a diverging line relative to the selected line consulting the line table will be described below. In the description which follows, let it be assumed that the contents in the files 1303, 1304, 1305 and 1306 are set in the conditions shown in FIGS. 13C to 13F, respectively.

Operation example (1)

Figure 16A:
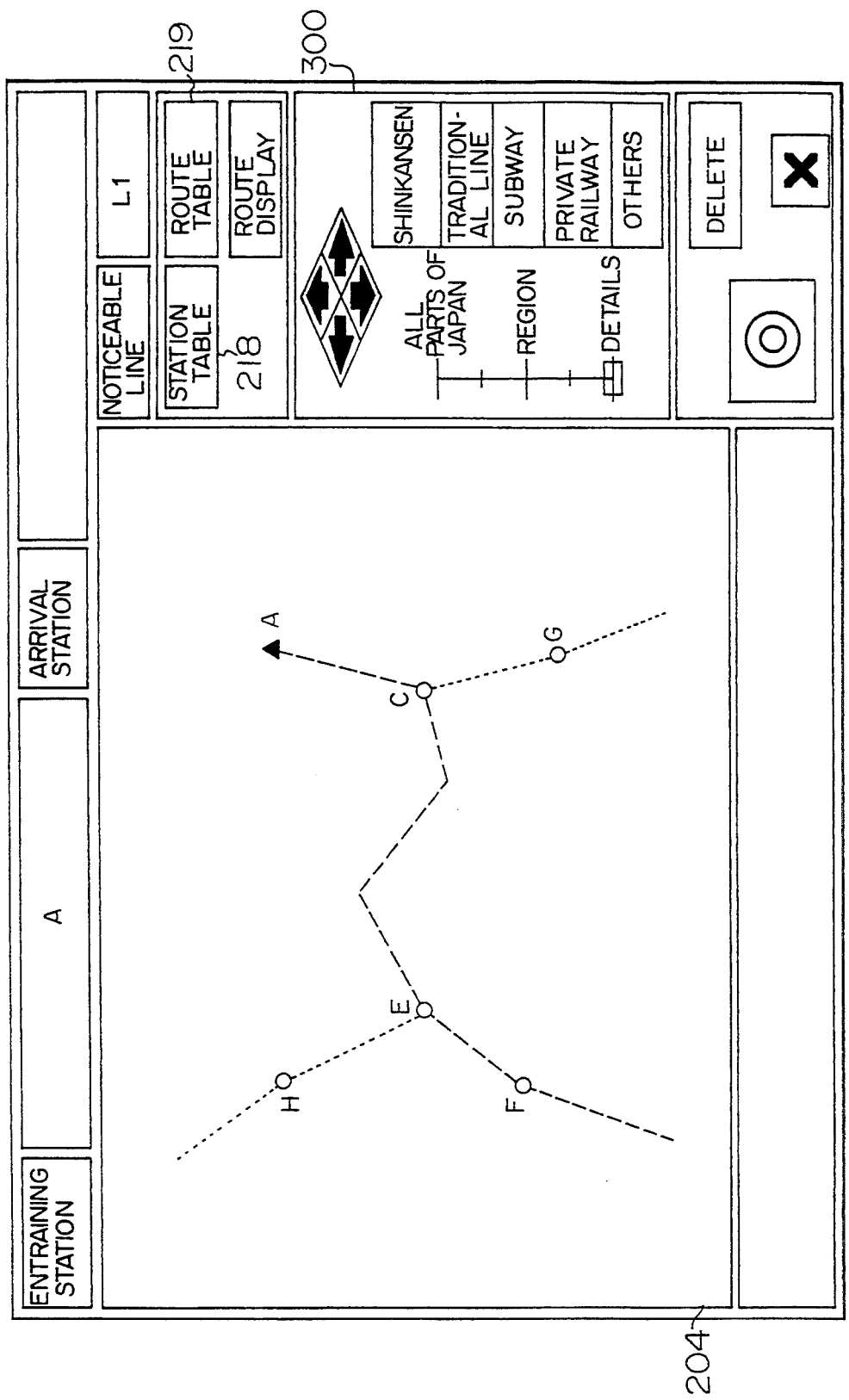
FIG. 16A is a diagram showing an initial state of a screen in an operation processing example (1)
Figure 16B:
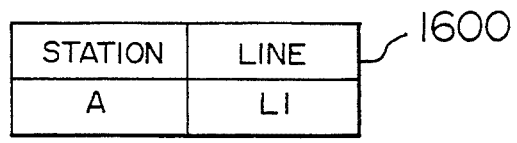
FIG. 16B is a diagram showing a content of a determined route table 1600 at this timing point.

In order to understand the present invention more clearly, let it be assumed herein that the display screen is now set in the state shown in FIG. 16A of the accompanying drawings and that a table 1600 that stores therein a determined route information is set in the state shown in FIG. 16B of the accompanying drawings. On the basis of these assumptions, a screen control operation being responsive to the following operation done by the user will be described. The determined route table 1600 is adapted to store therein the route information selected by the user and is prepared in the main memory 4.

At present, a section from the entraining station A to the line L1 is determined as the route. On the route diagram display area 204, there are displayed the line L1 in bold broken line as a noticeable line and the lines L2, L3 in fine broken lines as diverging lines diverging from the line L1. The route input program shown in FIG. 15 is now set in the input standby state (i.e., in step 1502). When the user selects the area 218 displayed within the command area 300 by the input apparatus 5, the input content is analyzed in step 1503. As a consequence, it is determined in decision step 1505 that "station table" is selected. Then, the station table processing is executed at step 1506.

Figure 17:
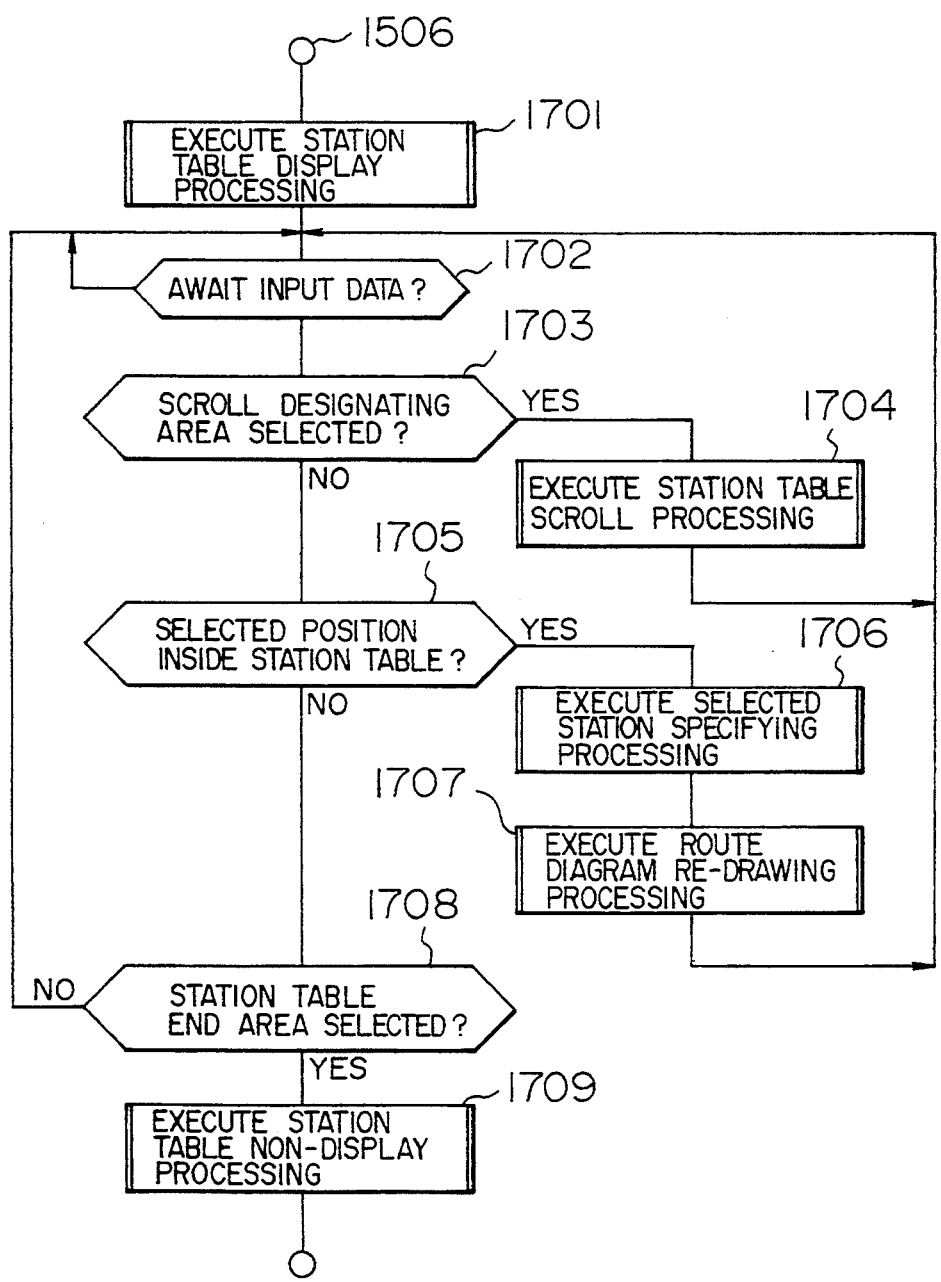
FIG. 17 is a flowchart to which references will be made in explaining a station table display processing in detail.
Figure 18:
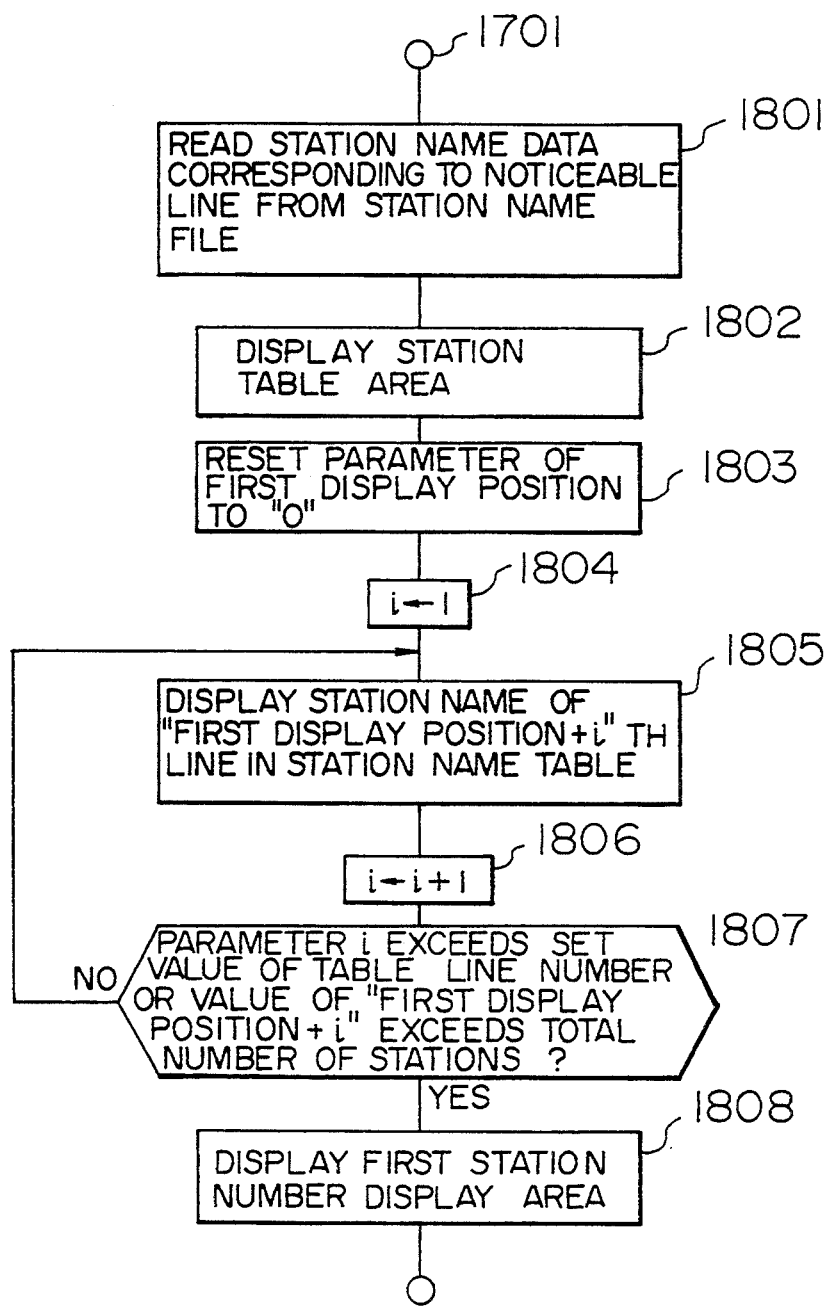
FIG. 18 is a flowchart showing in detail the station table display processing in FIG. 17.
Figure 19:
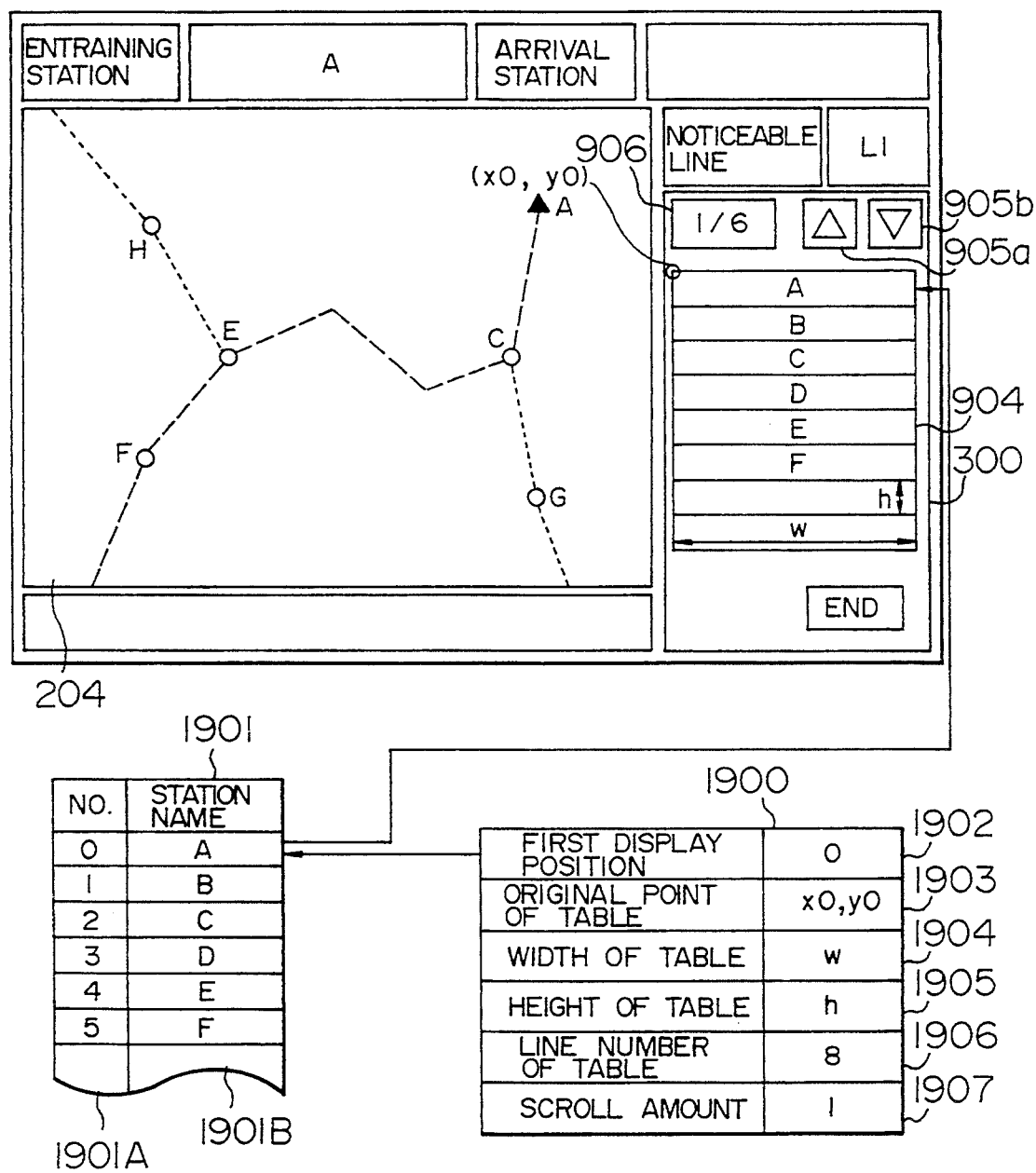
FIG. 19 is a diagram showing a displayed screen and the condition of a parameter when the station table display processing is executed.

FIG. 17 of the accompanying drawings shows a detailed flowchart of the station table processing step 1506 (see FIG. 15). In this routine in FIG. 17, the following steps 1701 through 1709 will be executed.

step 1701: Execute a station table display routine shown in FIG. 18 of the accompanying drawings. FIG. 19 of the accompanying drawings shows a route input screen displayed after the station table display processing routine was executed and contents of informations utilized in the station table processing. The station table display processing routine comprises the following steps 1801 through 1808.

step 1801: Read station name data corresponding to the noticeable line from the station name file 1304 and store the same in a station name table shown in FIG. 19. The station name table 1901 is adapted to temporarily store therein a station name 1901B displayed on the station table in the form corresponding to a parameter 1901A. As a method for storing station name data in the station name table 1901 in the sequential order, there can be considered methods such as an up train order, a down train order and a Japanese alphabetical order. The sequential order that the station name data are stored in the station name table 1901 is not limited thereto and the present invention can employ an arbitrary method. In FIG. 19, reference numeral 1900 depicts a work table in which there are stored various parameters necessary for displaying the station name table.

step 1802: Output a format including the station name table 904, the scroll designating area 905 and the first station number display area 906 to the command area 300.

step 1803: Reset a value of a parameter 1902 representative of a first display position on the work table 1900 to "0". The first display position 1902 is a parameter representative of a line number of a station table in which there is stored a station name displayed on the first line of the station table. As a value set in the first display position, there can be used a line number of a station table in which there is stored a station name displayed on the screen at present, a previously-designated value or the like, in addition to "0" that expresses the starting portion of the station table.

step 1804: Initialize a value of parameter i representative of the line number of the station table 904 to "1".

step 1805: Display a station name of "first display position+i'th" line stored in the station name table 1901 on the i'th line of the station name table 904. The station name display position is calculated from coordinate values (x0, y0) of a table original point 1903, a value w of a table width 1904 and a value h of a table height 1905, each of which is stored in the work table 1900 in advance.

Assuming that (xw, yw) are the coordinate values of lower left corner of the displayed character sequence, then the coordinate values are calculated by the equations expressed as:

$$xw=x0, yw=y0+h*i$$

step 1806: Increment the value of parameter i by 1.

step 1807: Determine whether or not the value of the parameter i exceeds the set value of a table line number 1906 or whether or not the value of "first display position+i" exceeds the total number of stations registered in the station name table 1901. If a judged result is false as represented by a NO at decision step 1807, then the processing returns to step 1805. If it is true as represented by a YES at decision step 1807, then the processing proceeds to the next step 1808.

In this embodiment, the number of station on the line L1 and which is registered in the station name table 1901 is "6" and the set value of the table line number 1906 is "8". Therefore, after the sixth station F on the station name table 1901 was displayed, the processing proceeds to the next step 1808.

step 1808: Display "(first display position+1)/number of stations" on the first station number display area 906 displayed within the command area 300. Contents displayed on the first station number display area 906 are not limited thereto and other data such as page numbers of the station name table or the like may be displayed in the first station number display area 906.

Figure 21:
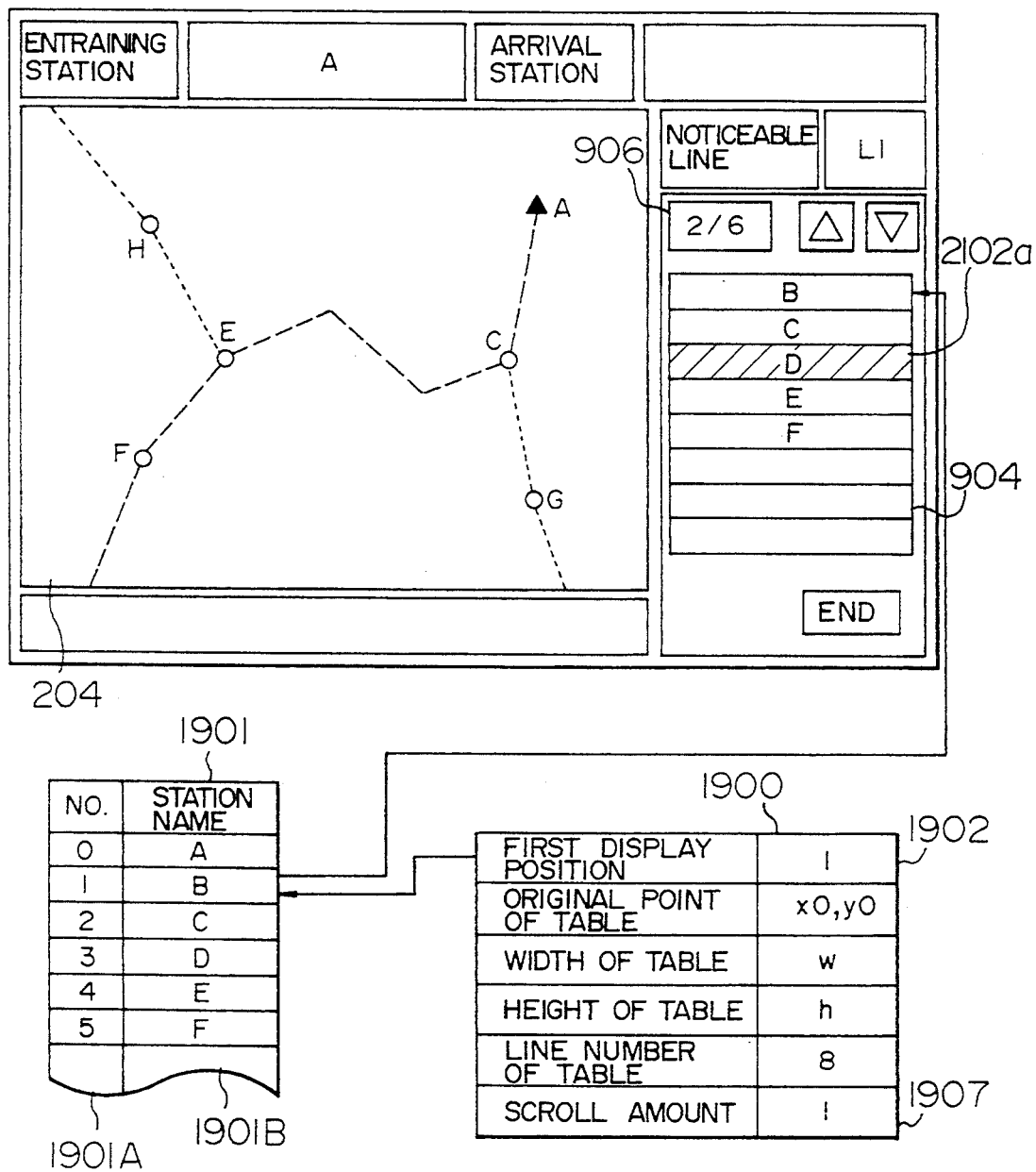
FIG. 21 is a diagram showing a displayed screen and the condition of the parameter when the station table scroll processing is executed.

Referring back to FIG. 17, in step 1702, the apparatus is set in the standby mode to await the input of data by the user. When the user selects the upward scroll designating area 905a of the table, the following control operation will be effected.

step 1703: Determine whether or not the upward or downward scroll designating area 905a or 905b is selected in response to the user's input operation. If a judged result is true as represented by a YES in the decision step 1703, then the processing proceeds to the next step 1704. If not, then the processing proceeds to the next step 1705. In this embodiment, step 1704 is executed.

step 1704: Execute a station table scroll processing routine which is illustrated in detail in FIG. 20 of the accompanying drawings. As shown in FIG. 20, the scroll processing routine comprises steps 2001 through 2013 which will be described below. FIG. 21 of the accompanying drawings shows a display screen displayed after this processing was executed and the state that the content of information utilized in the station table processing is changed.

step 2001: Determine whether or not the area, selected by the user at step 1702, is the upper scroll area 905a. If a judged result is true as represented by a YES at decision step 2001, then the processing proceeds to the next decision step 2002. If not, then the processing proceeds to the next decision step 2005.

step 2002: Determine whether or not a value of "first display position 1902+scroll amount 1907" is less than the number of stations registered in the station name table 1901. The scroll amount 1907 is a parameter that represents the scroll amount per scroll operation. The value of this scroll amount 1907 is assumed to be set in the work table 1900 in advance. If a judged result is true as represented by a YES at decision step 2002, then the processing proceeds to step 2003. If the judged result is false as represented by a NO at decision step 2002, then the processing proceeds to step 2004.

step 2003: Update the value of the first display position 1902 to "first display position+scroll amount".

step 2004: Update the value of the first display position 1902 to the number of stations registered in the station name table 1900.

step 2005: Determine whether or not the area selected by the user in step 1702 is the downward scroll area 905b. If a judged result is true as represented by a YES at decision step 2005, then the processing proceeds to the next decision step 2006. If not, the processing proceeds to step 2009.

step 2006: Determine whether or not "first display position—scroll amount" is larger than "0". If a judged result is true as represented by a YES at decision step 2006, then the processing proceeds to step 2007. If the judged result is false as represented by a NO at decision step 2006, then the processing proceeds to step 2008.

step 2007: Update the value of the first display position 1902 to the value of "first display position—scroll amount".

step 2008: Reset the value of the first display position to "0".

steps 2009 to 2011: Display station name on the table while incrementing the value of the parameter i by 1 from the initial value "1", similarly to the steps 1804 to 1807 shown in FIG. 18.

step 2012: Determine whether or not the value of the parameter i exceeds the line number 1906 of the table or whether or not a value of "first display position+i" exceeds the number of stations registered in the station name table. If a judged result is true as represented by a YES at decision step 2012, then the processing proceeds to step 2013. If not, then the processing returns to step 2010.

If now the user selects the upward scroll area 905a, then stations on second to sixth lines of the station name table area displayed on the station name table 904 in steps 2001 to 2003, whereafter step 2013 is executed.

step 2013: Update the displayed content of the first station display area 906.

Figure 22:
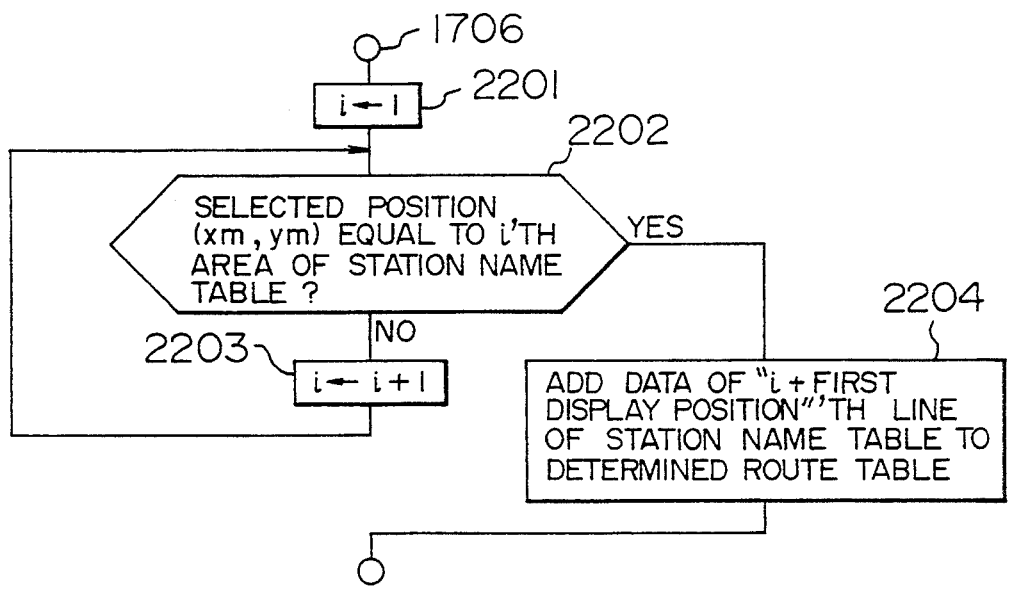
FIG. 22 is a flowchart showing in detail a selected station specifying processing in FIG. 17.

Referring back to FIG. 17, in step 1702, the apparatus is set in the standby mode to await data input by the user. Let it be assumed herein that the user selects by using the input apparatus 5 an area 2102a in which there is displayed the station D in the table 904.

step 1705: Determine whether or not the position selected in response to the data input by the user falls within the inside area of the station table 904. If a judged result is true as represented by a YES at decision step 1705, then the processing proceeds to step 1706. If not, then the processing proceeds to the next decision step 1708.

step 1706: Execute a selected station specifying processing routine shown in FIG. 22 of the accompanying drawings. As shown in FIG. 22, this routine is composed of steps 2201 to 2204 which will be described below.

step 2201: Set the value of parameter i representative of the line number of the station table 904 to "1".

step 2202: Determine whether or not the area selected at step 1702 is the i'th line area of the station table 904. If a judged result is true as represented by a YES at decision step 2202, then the processing proceeds to step 2204. If it is false as represented by a NO at decision step 2202, then the processing proceeds to step 2203.

FIG. 23 of the accompanying drawings shows the condition that the above decision step 2202 is executed. As shown in FIG. 23, coordinate values (xm, ym) of a coordinate 2301 selected by the input apparatus 5 are compared with coordinate values of the upper left and lower right corners of the i'th line area. If the following conditions expressed as:

$$x0 \leq xm \leq x+w \text{ and } y0+h*(i-1) \leq ym \leq y0+h*i$$

are satisfied, then the judged result in decision step 2202 becomes true. If the above conditions are not satisfied, then the judged result becomes false. In the example of FIG. 22, the above judged result becomes true when i=3.

step 2203: Increment the value of the parameter i by 1. Then, the processing returns to step 2202.

step 2204: Add the station name data 1901B of "i+first display position" 'th line on the station name table 1901 to the determined route table 1600. In this example, since i=3 and the first display position =1, "station name D" on the fourth line of the station table 1901 is added to the determined route table 1600.

Figure 24:
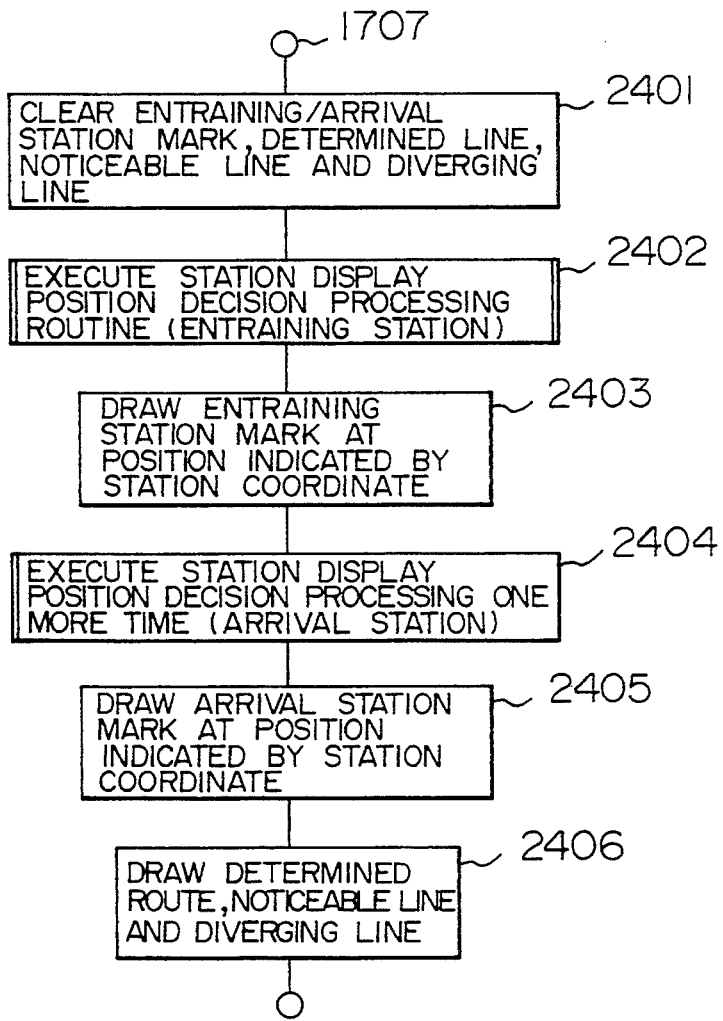
FIG. 24 is a flowchart showing in detail a line diagram re-drawing processing step in FIG. 17.

Referring back to FIG. 17, a route diagram re-drawing processing routine shown in FIG. 24 of the accompanying drawings is executed in step 1707. As shown in FIG. 24, this routine is composed of steps 2401 to 2406 which will be described below.

step 2401: Clear the display of the entraining/arrival station mark, the determined line, the noticeable line and the diverging line.

step 2402: Execute a station display position decision processing routine shown in FIG. 25 of the accompanying drawings by using a station name of the entraining station as an argument. As shown in FIG. 25, this routine is composed of steps 2501 to 2509 which follow.

step 2501: Set the station name employed as the argument to a station parameter x.

step 2502: Obtain a line name of a line connected to the station x from the determined route table 1600. By way of example, this time (at timing point of FIG. 23), the line L1 is obtained from the determined route table 1600 as the line to which the station A is connected.

step 2503: Read data file corresponding to the line L1 obtained in step 2502 from the drawing station coordinate file 1303 and obtain the coordinate 1303C of the station x.

step 2504: Determine whether or not the coordinate of the station x obtained in step 2503 is NULL. In this example, in the drawing station coordinate file 1303, the coordinates of the station x (station A) are (xa, ya) and a judged result therefore becomes false. If the judged result is false as represented by a NO at decision step 2504, then step 2505 is executed. If the judged result is true as represented by a YES at decision step 2504, then steps 2506 to 2509 are executed. Steps 2506 to 2509 will be described more fully later on.

step 2505: Return the coordinate values of the station x as a result.

Referring back to FIG. 24, in step 2403, the entraining station mark is drawn at the position of the station coordinate obtained in step 2502.

step 2404: Execute one more time the station display position decision processing routine shown in FIG. 25 by employing the station name of the arrival station as the argument. At that time, the following processings are executed in the flowchart of FIG. 25.

step 2501: Similarly as described above.

step 2502: Similarly as described above. In this example, the line L1 is obtained from the determined route table 1602 as a line to which the station D is connected.

step 2503: Similarly as described above.

step 2504: Similarly as described above. In this example, coordinate data of the station D corresponding to the station x are not stored in the drawing station coordinate file 1303 so that a judged result becomes true as represented by a YES. Then, the coordinate values of the station x are determined by executing the processing in steps 2506 to 2509.

Figure 26:
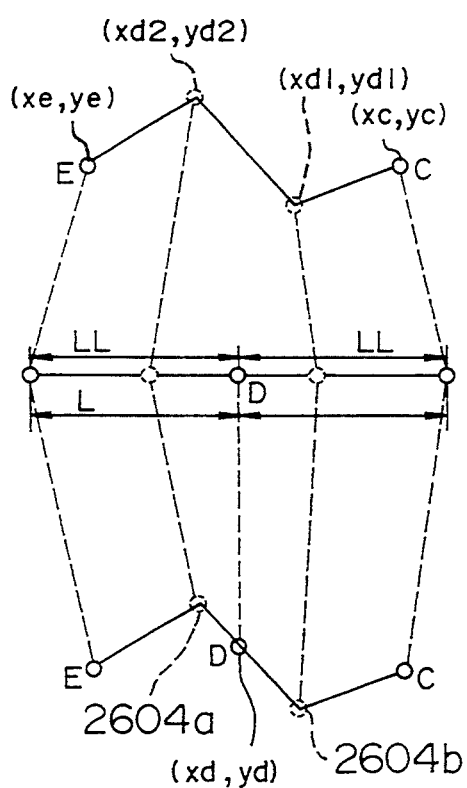
FIG. 26 is a diagram to which references will be made in explaining a method of determining a display position of a station D in the above operation processing example (1)

The processing in steps 2506 to 2509 will be described with reference to also FIG. 26 of the accompanying drawings.

step 2506: Obtain stations (stations $\alpha$, $\beta$) that are ahead of and behind the station x from the station name file 1304 and the drawing station coordinate file 1303. The station $\alpha$ corresponding to the station D becomes the station C and the station $\beta$ becomes the station E.

step 2507: Calculate a line segment connecting the stations $\alpha$ and $\beta$ and a calculated line segment is represented by l. The length l of the line segment connecting the stations C and E is obtained by the calculation according to an equation 2601 shown in FIG. 26 on the basis of coordinate data stored in the drawing station coordinate file 1303.

step 2508: Calculate a proper length of a line segment connecting the stations $\alpha$ and x when the station x is displayed on the line connecting the stations $\alpha$ and $\beta$. A calculated length is represented by l1. In this embodiment, assuming that an interval of each station between the stations C and D is equal, then the line l1 connecting the stations C and D is obtained by the calculation expressed in the equation 2602 shown in FIG. 26.

step 2509: Calculate a coordinate of a point of the length l1 from the station $\alpha$ from the line connecting the stations $\alpha$ and $\beta$. A calculated coordinate is set to the coordinate of the station x. In this embodiment, the point of the length l1 from the station C is located between two dummy stations 2604a and 2604b which satisfy an equation 2603 shown in FIG. 26. The coordinate of the station D is obtained by the calculation in an equation 2606 shown in FIG. 26.

step 2505: Similarly as described above.

Figure 27:
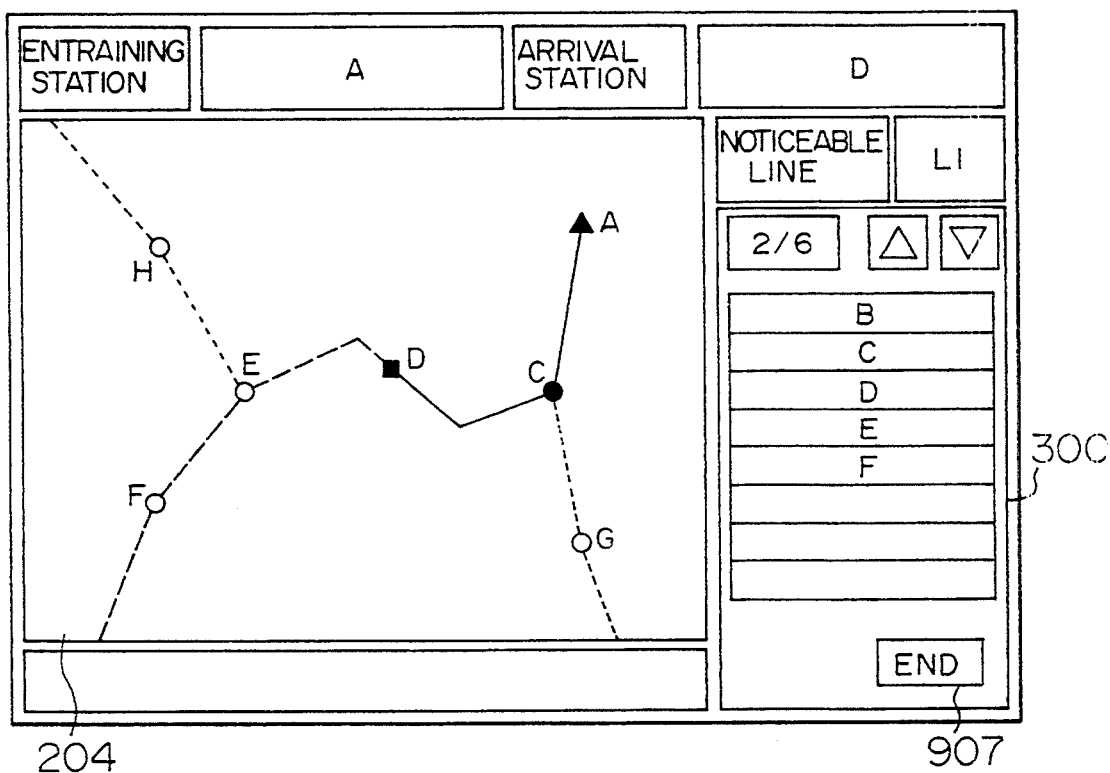
FIG. 27 is a diagram showing a screen displayed after the line diagram re-drawing processing was executed.

Referring back to FIG. 24, the entraining station mark is drawn at the position of the station coordinate obtained in the step 2504.

step 2406: Draw the determined route, the noticeable line and the diverging line within the route diagram display area 204. A display screen at that timing point is illustrated in FIG. 27 of the accompanying drawings. In this example, as shown in FIG. 27, the entraining station is represented by a triangle mark, the arrival station is represented by a square mark, the determined route is represented by a bold solid line, the noticeable line is represented by a bold broken line and the diverging line is represented by a fine broken line.

Figure 28:
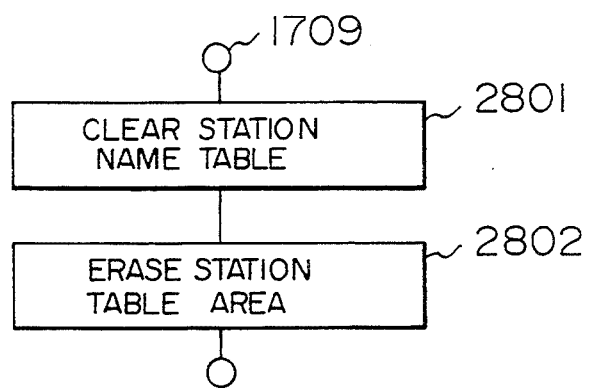
FIG. 28 is a flowchart showing in detail a station name table non-displayed processing step in FIG. 17.
Figure 29:
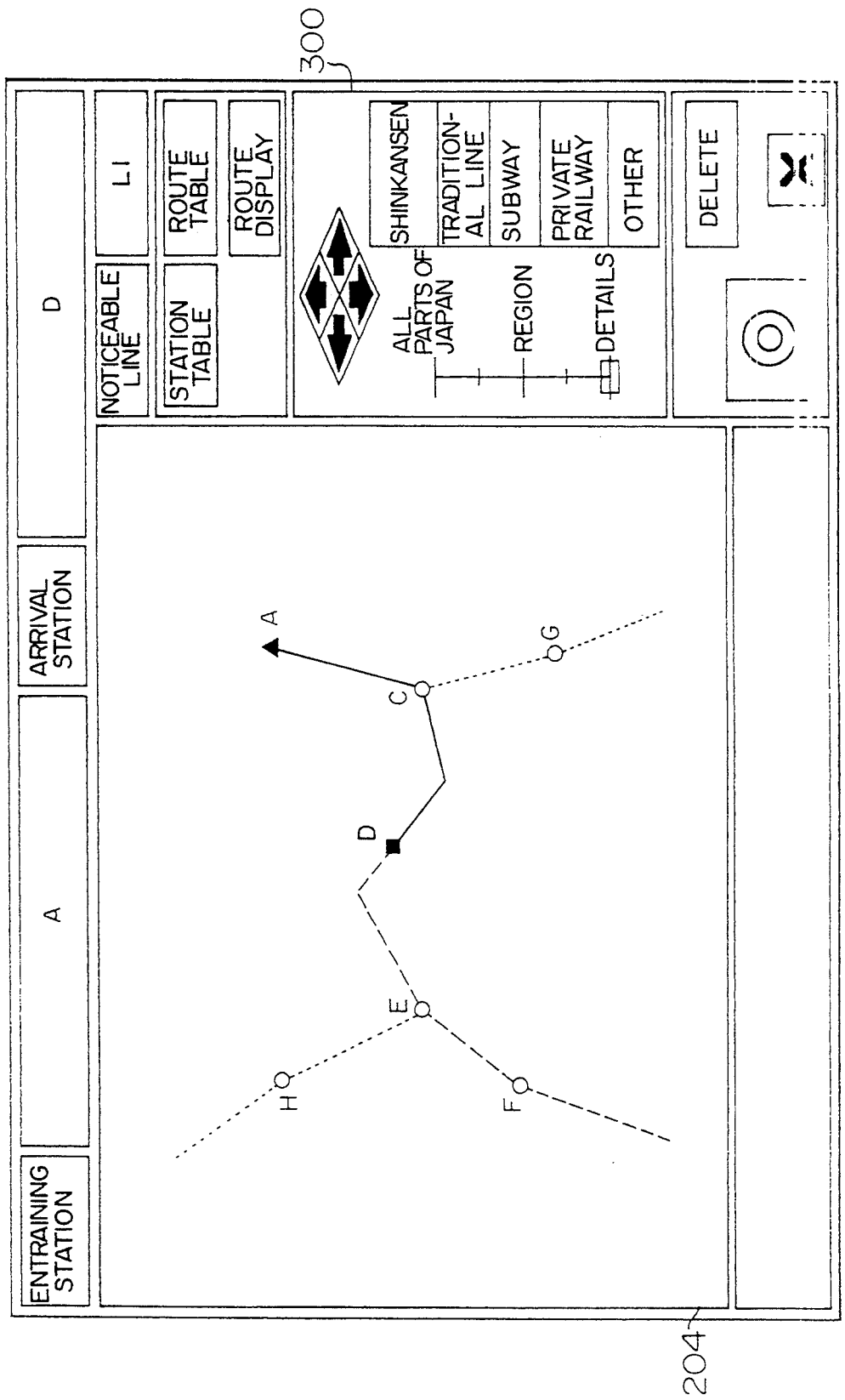
FIG. 29 is a diagram showing a screen displayed after the station name table non-displayed processing was executed.

Referring back to FIG. 17, in step 1702, the apparatus is set in the standby mode to await the input of data. Let it be assumed herein that the user selects the station table end area 907 by operating the input apparatus 5.

step 1708: Determine whether or not the station table end area 907 is selected in response to the input from the user. If a judged result is true as represented by a YES at decision step 1708, then the next step 1709 is executed.

step 1709: Execute a station table non-display processing routine shown in FIG. 28 of the accompanying drawings. As shown in FIG. 28, this routine is composed of steps 2801 and 2802.

step 2801: Clear the contents of the station table 1901.

step 2802: Clear the station name table 904, the scroll area 905 and the like displayed within the command area 300 and returns the command area 300 to the initial state as shown in FIG. 29.

Operation Example (2)

Similarly to the operation example (1), control operation corresponding to the following operation will be described under the condition such that the route input screen of FIG. 16A and the determined route table 1600 are set in the present states.

Figure 30:
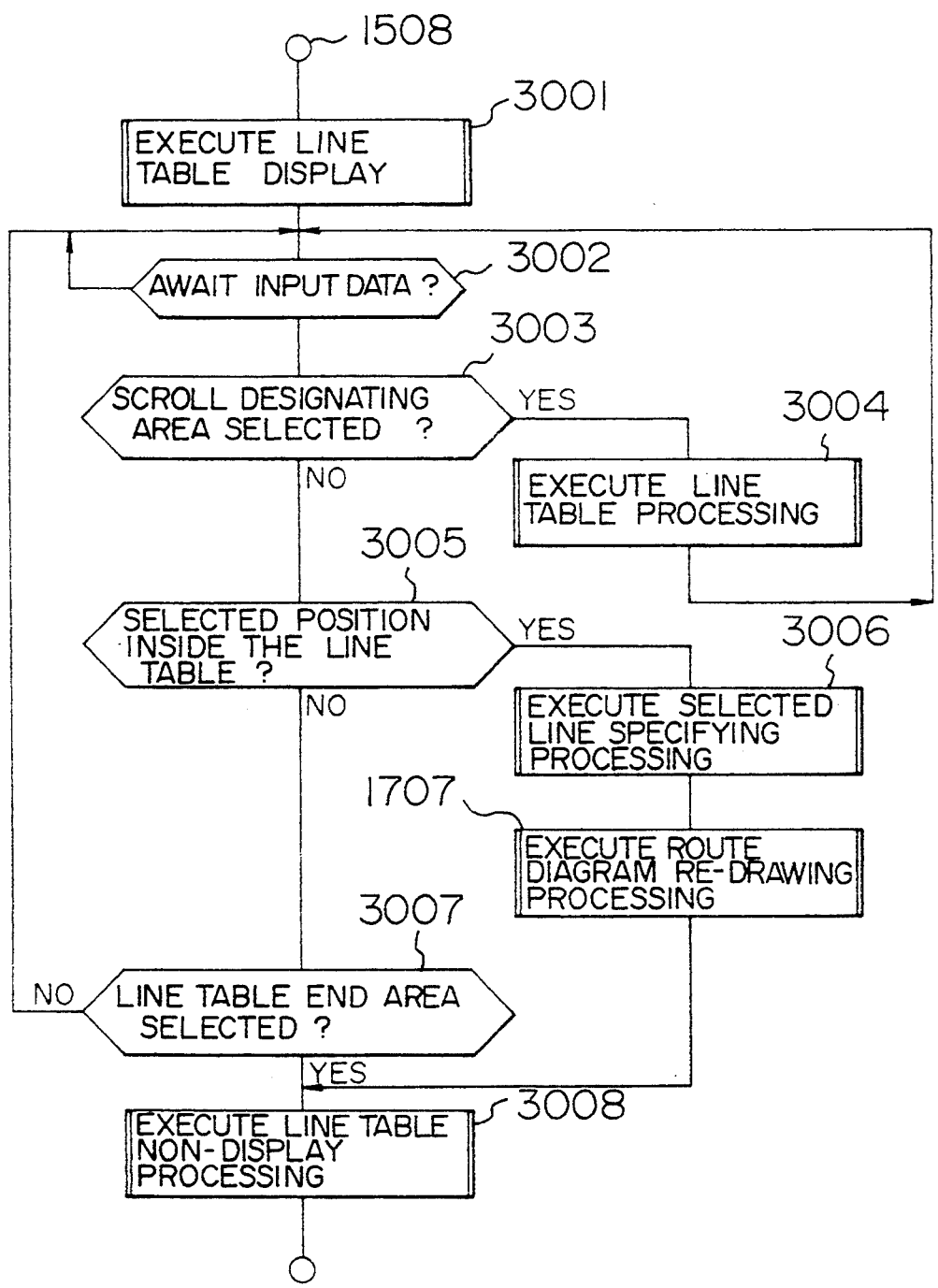
FIG. 30 is a flowchart showing in detail a line table display processing in FIG. 15.
Figure 31:
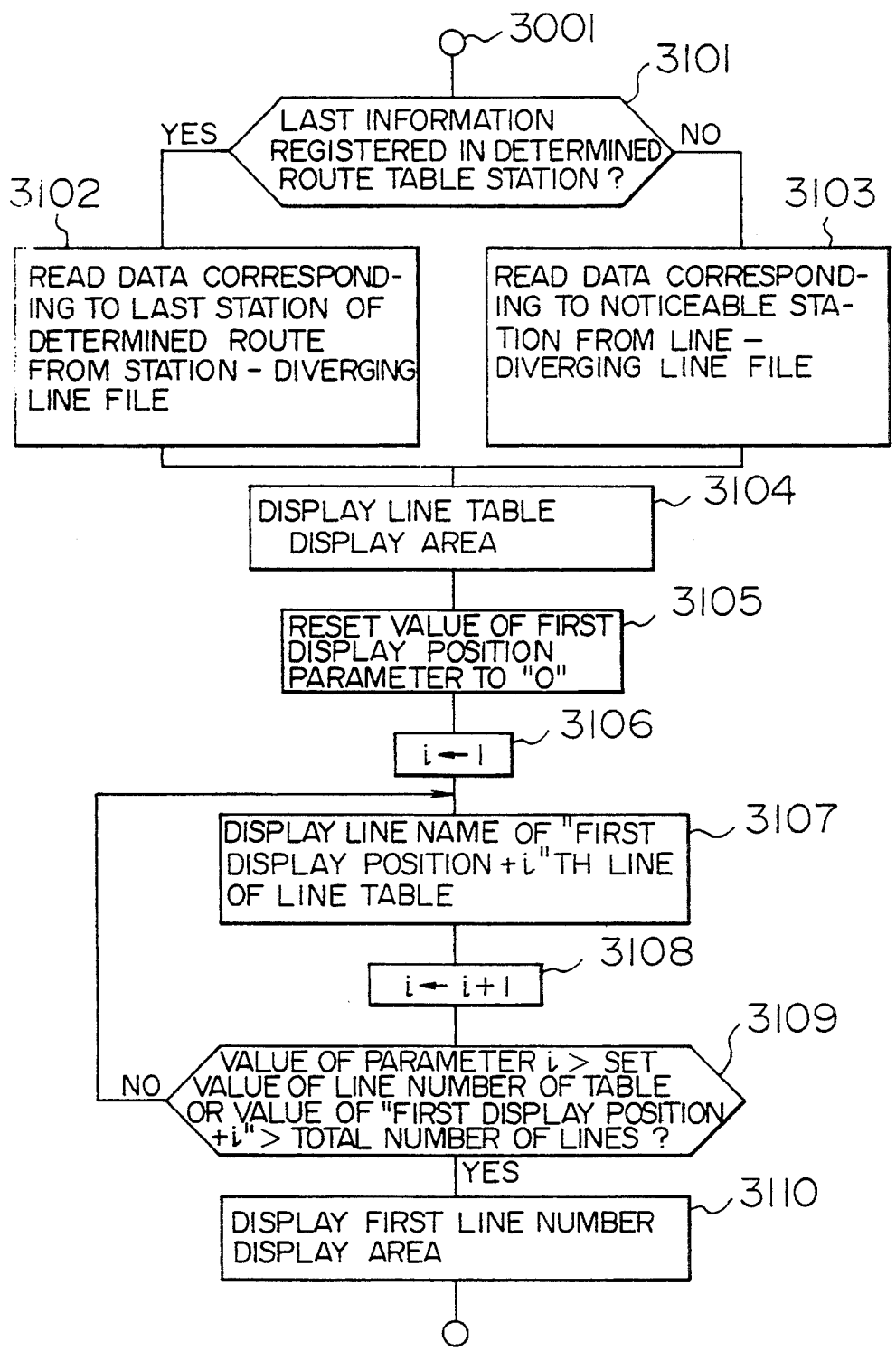
FIG. 31 is a flowchart showing in detail a line table display processing step in FIG. 30.

Let it be assumed that the user selects the area 219 within the command area 300 by the input apparatus 5. Then, the input data is analyzed in step 1503. As a result, it is determined in the next decision step 1504 that "line table" is selected. Then, a line table processing routine 1508 is executed. As shown in FIG. 30, the line table processing routine is composed of steps 3001 to 3008 which will be described below.

step 3001: Execute a line table display processing routine shown in FIG. 31. As shown in FIG. 31, this line table display processing routine is composed of steps 3101 to 3110. FIG. 32 of the accompanying drawings shows a display screen displayed after the line table display processing routine was executed and informations utilized therein. In FIG. 32, reference numeral 3200 depicts a work table in which there are stored parameters used to display the line table 1203. The kinds of parameters are similar to those of the work table 1900 that was used to display the non-displayed station name table 904. In FIG. 32, reference numeral 3201 depicts a line name table in which line name data to be displayed on the diverging line table are temporarily stored. Diverging line names 3201B and station names 3201C connected to these diverging lines are stored in the line name table 3201 in association with parameters 3201A.

step 3101: Determine whether or not the last information registered in the determined route table 1600 is a station. If it is the station as represented by a YES at decision step 3101, then the processing proceeds to step 3102. If the last information is not the station (if it is a line) as represented by a NO at decision step 3101, then the processing proceeds to step 3103.

step 3102: Read data 1306B of line (noticeable line) corresponding to the last station of the determined route from the station—diverging line file 1306 and store the same temporarily.

step 3103: Read data 1305B and 1305C corresponding to the above noticeable station from the line diverging line file 1306 and store the same in the line name table 3201 as data 3201B and 3201C. In the example shown in FIG. 31, the judged result in step 3101 becomes a false as represented by a NO and the step 3103 is therefore executed, thereby setting the data in the line name table 3201.

step 3104: Display a format of the line table 1203, the scroll designating area 1204 and the first line number display area 1205 on the command area 300.

step 3105: Reset the value of the first display position parameter 3202 stored in the work table 3200 to an initial value "0". The first display position 3202 is a parameter that represents a line (record) number of the line name table 3201 in which there is stored a station name that should be displayed on the first line of the line table 1203. As the values set at the first display position 3202, there can be employed a line number of the line table in which there are stored line names displayed on the screen at present, previously-designated different values or the like in addition to the initial value "0" representative of the starting portion of the line name table 3201.

step 3106: Set the parameter i representative of the line number of the line table to "1".

step 3107: Display the line name 3201B located at "first display position+i"'th line of the line name table 3201 on the i'th line of the line table 1203 on the display screen. The position at which the line name is displayed can be obtained from coordinate values (x0, y0) that were previously set as a parameter 3202 representative of the original point of the table, a value w of a parameter 3204 representative of the width of the table, a value h of a parameter 3205 representative of the height of the table.

step 3108: Increment the value of the parameter i by 1.

step 3109: Determine whether or not the value of the parameter i exceeds the set value of the parameter 3206 representative of the number of lines on the table or whether or not the value of "first display position+i" exceeds the total number of lines registered in the line name table 3201. If a judged result is false as represented by a NO at decision step 3109, then the processing returns to step 3107. If the judged result is true as represented by a YES at decision step 3109, then the next step 3110 is executed.

step 3110: Display the value of "first display position+1" and the "line number" on the first station number display area 1205 by a slant line interposed therebetween.

Figure 34:
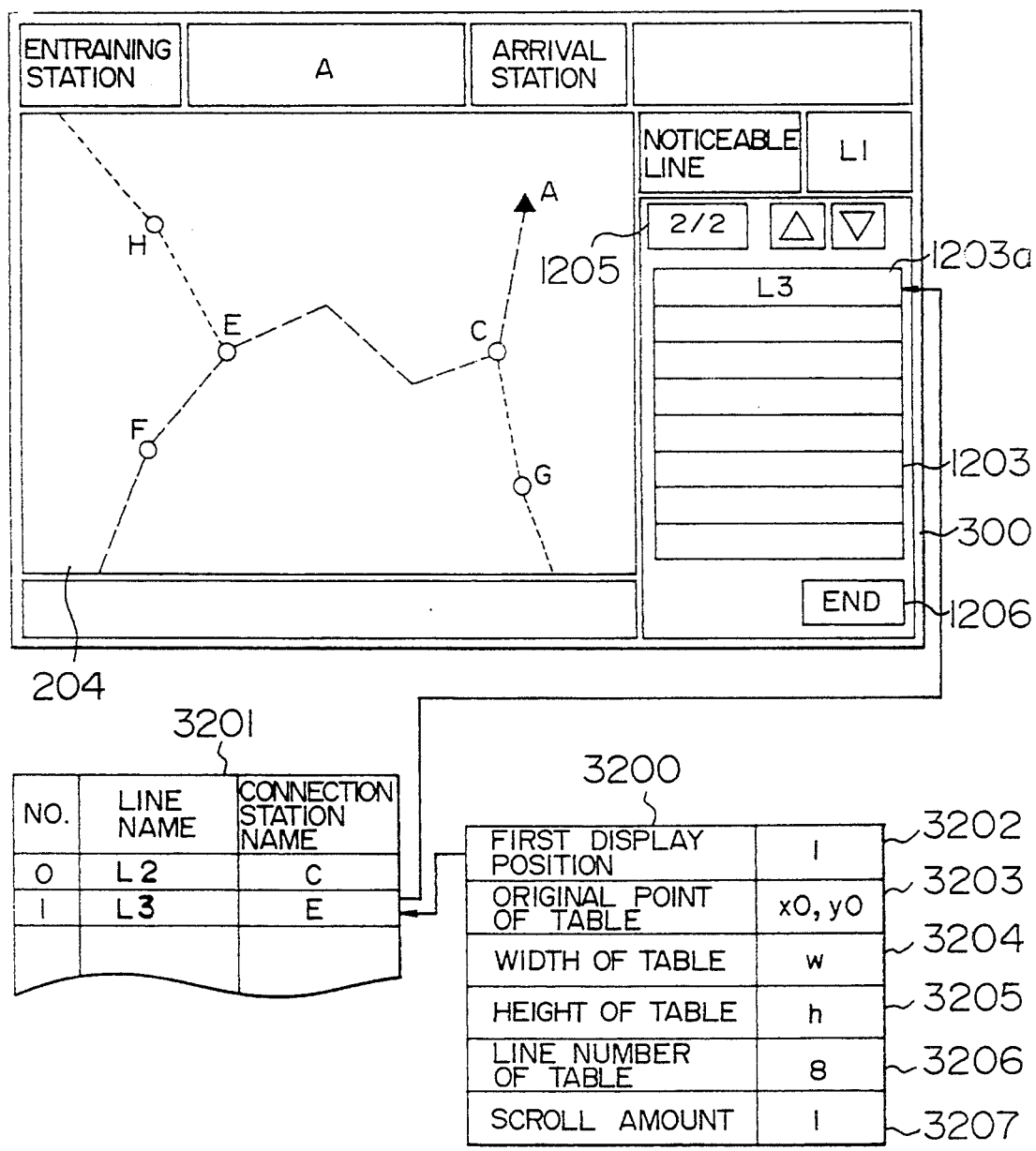
FIG. 34 is a diagram showing a displayed screen and the condition of a parameter when the line table scroll processing is executed.

Referring back to FIG. 30, in step 3002, the apparatus is set in the standby mode to await the input of data. In this case, let it be assumed that the user selects the upward scroll designating area 1204a of the table by the input apparatus 5.

step 3003: Determine whether or not the input from the user is the selection of the upward or downward scroll designating area 1204a or 1204b of the table. If a judged result is true as represented by a YES at decision step 3003, then the processing proceeds to step 3004. If not, then the processing proceeds to step 3005. In this example, the step 3004 is executed.

step 3004: Execute a line table scroll processing routine shown in FIG. 33 of the accompanying drawings. As shown in FIG. 33, this scroll processing routine is composed of steps 3301 to 3313 which will be described below. FIG. 34 of the accompanying drawings shows a display screen displayed after the above scroll processing routine was executed.

step 3301: Determine whether or not the area selected by the user in step 3002 is the upward scroll area 1204a. If a judged result is true as represented by a YES at decision step 3301, then the processing proceeds to the next decision step 3302. If the judged result is false as represented by a NO at decision step 3301, then step 3305 is executed.

step 3302: Determine whether or not the value of "first display position+scroll amount" is smaller than the number of lines stored in the line name table 3201. In this case, the scroll amount is previously determined by a parameter 3207 that represents the scroll amount per scroll processing. If a judge result is true as represented by a YES at decision step 3302, the processing at step 3303 is executed. If it is false as represented by a NO at decision step 3302, the processing in step 3304 is executed.

step 3303: Set the value of the first display position 3202 to the value of "first display position+scroll amount".

step 3304: Set the value of the first display position 3202 to the number of lines registered in the line name table 3201.

step 3305: Determine whether or not the area selected by the user in step 3002 is the downward scroll area 1204b. If a judged result is true as represented by a YES at decision step 3305, then the processing proceeds to the next decision step 3306. If it is false as represented by a NO at decision step 3305, then the processing proceeds to step 3309.

step 3306: Determine whether or not "first display position—scroll amount" is larger than the value "0". If a judged result is true as represented by a YES at decision step 3306, then step 3307 is executed. If not, then step 3308 is executed.

step 3307: Set the value of the first display position 3202 to the value of "first display position—scroll amount".

step 3308: Reset the value of the first display position to "0".

steps 3309 to 3311: Display sequentially station names registered on the line name table 3201 while incrementing the value (initial value is "1") of the parameter i by 1, similarly to the steps 3104 to 3106 of FIG. 31.

step 3312: Determine whether or not the value of the parameter i exceeds the set value of the table line number 3206 or whether or not the value of "first display position+i" exceeds the total number of lines registered in the line name table 3201. If a judge result is false as represented by a NO at decision step 3312, then the processing returns to step 3310. If the judged result is true as represented by a YES at decision step 3312, then the processing proceeds to the next step 3313. If the user selects the upward scroll area 1204a, by executing the above processing, the value of the first display position 3401 is updated to "1". Then, the line L2 on the second line of the line name table 3201 is displayed on the line table 3402, whereafter the processing proceeds to the step 3313.

step 3313: Update the displayed content of the first line display area 1205.

Figure 35:
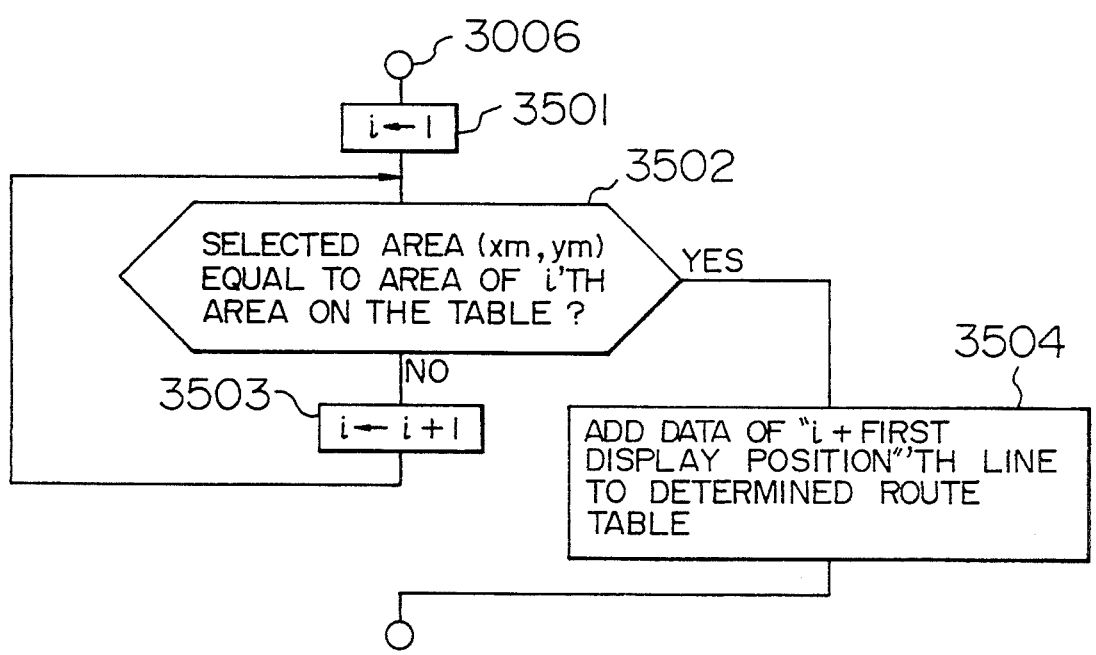
FIG. 35 is a flowchart showing in detail a selected line specifying processing in FIG. 30.

Referring back to FIG. 30, in step 3002, the apparatus is set in the standby mode to await the input from the user. In this example, it is assumed that the user selects the display area 1203a of the line L3 within the line table 1203 by the input apparatus 5.

step 3005: Determine whether or not the position selected by the input apparatus 5 lies in the inside area of the line table 1203. If a judged result is true as represented by a YES at decision step 3005, then the processing proceeds to step 3006.

step 3006: Execute a selected line specifying processing routine shown in FIG. 35 of the accompanying drawings. As shown in FIG. 35, this routine is composed of steps 3501 to 3504 which will be described below.

step 3501: Set the value of the parameter i representative of the line number on the line table 1203 to "1".

step 3502: Determine whether or not the area selected by the input apparatus 5 is the area of the i'th area on the table.

This decision step 3502 will be described with reference to also FIG. 36 of the accompanying drawings. If a coordinate 3601 (xm, ym) designated by the input apparatus 5 satisfies the following conditions expressed as:

$$x0 \leq xm \leq x0+w \text{ and } y0+h*(i-i) \leq ym < y0+h*ij$$

then a judged result in step 3502 becomes true. If the judged result is true as represented by a YES at decision step 3502, then the processing in step 3504 is executed. If the judged result is false as represented by a NO at decision step 3502, then the processing in step 3503 is executed. In the example shown in FIG. 36, the judged result becomes true when i=1.

step 3503: Increment the value of the parameter i by 1. Then, the processing returns to step 3502.

step 3504: Add data of "i+first display position"'th line of the line name table 3201 to the determined route table 1600. In the example of FIG. 36, since i=1 and the first display position=1, the data (line name L3) on the second line of the line name table 3201 is added to the determined route table 1600.

Figure 37:
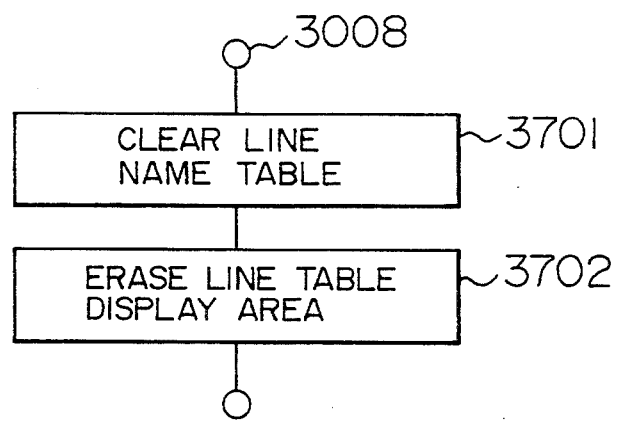
FIG. 37 is a flowchart showing in detail a line table non-display processing in FIG. 30.

Referring back to FIG. 30, the re-drawing processing of the route diagram is effected in step 1707. The content of this processing is similar to that of the map re-drawing processing that was described in the station table display processing in the operation example (1).

step 3008: Execute non-display processing routine of the line table shown in FIG. 37 of the accompanying drawings. In this routine, as shown in FIG. 37, the content of the line name table 3201 is cleared at step 3701 and then, the line name table area 1202 is cleared at the next step 3702. FIG. 38 of the accompanying drawings shows a display screen at that time.

The line table non-display processing executed in step 3008 is also executed when the user select the line table end area 1206 (i.e., step 3007).

As is apparent from the foregoing description, according to the route information input apparatus of the present invention, since the route diagram displayed on the screen is simplified and useful informations which are omitted from the route diagram are displayed in the form of the table, the operator can search necessary informations with ease and input the route information with ease.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An apparatus for inputting route information necessary to specify a route from one node element serving as a starting point to another node element serving as a terminal, comprising:

(a) display means having a display screen for furnishing a user with circumstances so that said user can input route information;

(b) pointing means operated by said user to designate a position on said display screen;

(c) data processing means responsive to an input operation of said pointing means to execute a data processing in accordance with a program prepared in advance to thereby change a displayed content on said display screen;

(d) first file means for storing therein positional information necessary to draw a line diagram for designating a route on said display screen with respect to major node elements of a plurality of node elements in respective lines truly existing on an actual line map; and (e) second file means for storing therein code information necessary to display a table of node elements on said display screen with respect to a plurality of node elements in respective lines including node elements omitted from said line diagram, wherein said data processing means comprises:

first means for displaying on a first area of said display screen a line diagram that is presented in a simplified form by partly omitting truly existing node elements on the basis of the positional information stored in said first file means;

second means for registering a line of interest designated by said user with said pointing means;

third means for selectively retrieving code information of a group of node elements located on said line of interest and for displaying on a second area of said display screen said group of node elements omitted from said line diagram displayed on said first area in the form of a table; and fourth means for storing therein elements displayed within said first or second area selected by said pointing means as input information specifying a part of a route.

2. The route information input apparatus according to claim 1, wherein the line diagram displayed on said first area of said display screen is composed of a plurality of lines connected in a crossing or diverging fashion, and said first means includes means being responsive to a particular operation of the route information done by said pointing means to partly change the state of said line diagram displayed on said first area so that a line to be selected next can be visually distinguished from other lines.

3. The route information input apparatus according to claim 1, wherein the line diagram displayed on said first area of said display screen is composed of a plurality of lines connected in a crossing or diverging fashion, and said first means includes means being responsive to a particular operation of the route information done by said pointing means to partly change the state of said line diagram displayed on said first area so that route components that were already specified and a line to be selected next can be visually distinguished from other lines.

4. The route information input apparatus according to claim 1, wherein said processing means further includes fifth means for generating positional information of a selected node element on the basis of the positional information of said major node elements stored in said first file means each time said selected node element is selected from a table on said second area by said pointing means, and sixth means for additionally displaying said selected node element on said line diagram displayed on said first area by using the generated positional information.

5. The route information input apparatus according to claim 1, wherein said second means includes means for selectively displaying a group of node elements omitted in said line diagram displayed on said first area on said second area in the form of a table with respect to a line specified last in the route information that was already specified.

6. The route information input apparatus according to claim 1, wherein said data processing means includes means for selectively displaying a name of at least one line diverging from a line specified last in the route information that was already specified on said second area in the form of a table.

7. A route information input method for specifying a route from one node element serving as a starting point to another node element serving as a terminal in a terminal apparatus including a display screen and a pointing device, comprising the steps of:

(a) displaying on a first area of said display screen a line diagram presented in a simplified form where truly existing node elements are partly omitted and which is composed of a plurality of node elements and a line segment connecting said note elements;

(b) designating one node element or line segment in said line diagram by said pointing device;

(c) changing a display form so that the line diagram including the node element or line segment designated by said pointing device can be distinguished from other lines in said line diagram;

(d) displaying on a second area of said display screen a group of node elements omitted from said line diagram displayed on said first area in the form of a table with respect to a line specified last in route elements that were already specified; and (e) designating one node element displayed on said table by said pointing device, wherein route specifying elements selected on said first or second area by said pointing device are stored as route input information in a sequential order of time series.

8. An apparatus for inputting route information necessary to specify a route from one node element serving as a starting point to another node element serving as a terminal, comprising:

(a) display means having a display screen, for furnishing a user with circumstances so that said user can input route information;

(b) pointing means operated by said user to designate a position on said display screen;

(c) data processing means responsive to an input operation of said pointing means to execute data processing in accordance with a program prepared in advance to thereby change a displayed content on said display screen;

(d) first file means for storing therein positional information necessary to draw a line diagram for designating a route on said display screen with respect to major node elements of a plurality of node elements in respective lines truly existing on an actual line map; and (e) second file means for storing therein code information necessary to display a table of node elements on said display screen with respect to a plurality of node elements in respective lines including node elements omitted from said line diagram, wherein said data processing means comprises:

first means for displaying on a first area of said display screen a line diagram that is presented in a simplified form by partly omitting truly existing node elements on the basis of the positional information stored in said first file means, wherein the line diagram displayed on said first area of said display screen is composed of a plurality of lines connected in a crossing or diverging fashion, and said first means includes means being responsive to a particular operation of the route information done by said pointing means to partly change the state of said line diagram displayed on said first area so that route components that were already specified and a line to be selected next can be visually distinguished from other lines.

* * * * *